(12) United States Patent
Takegami

(10) Patent No.: US 6,580,626 B2
(45) Date of Patent: Jun. 17, 2003

(54) SWITCHING POWER SUPPLY

(75) Inventor: Eiji Takegami, Nagaoka (JP)

(73) Assignee: Densei-Lambda Kabushiki Kaisha (JP)

( * ) Notice: Subject to any disclaimer, the term of this patent is extended or adjusted under 35 U.S.C. 154(b) by 0 days.

(21) Appl. No.: 10/096,737

(22) Filed: Mar. 13, 2002

(65) Prior Publication Data

US 2002/0131282 A1 Sep. 19, 2002

(30) Foreign Application Priority Data

| Mar. 13, 2001 | (JP) | 2001-070141 |
| Mar. 13, 2001 | (JP) | 2001-070160 |
| Mar. 12, 2002 | (JP) | 2002-066904 |

(51) Int. Cl.[7] .................. H02M 3/24; H02M 3/335; H02J 1/00
(52) U.S. Cl. .................. 363/97; 363/21.06; 363/15
(58) Field of Search .................. 363/97, 60, 61, 363/95, 98, 89, 21.06, 21.07, 21.08, 15; 361/90, 91, 92, 93; 327/309, 307

(56) References Cited

U.S. PATENT DOCUMENTS

| 4,975,821 A | * | 12/1990 | Lethellier | 363/97 |
| 5,528,482 A | * | 6/1996 | Rozman | 363/20 |
| 5,535,112 A | * | 7/1996 | Vazquez Lopez et al. | 363/20 |
| 6,061,254 A | * | 5/2000 | Takegami | 363/97 |
| 6,169,675 B1 | * | 1/2001 | Shimamori et al. | 363/70 |

FOREIGN PATENT DOCUMENTS

| JP | 11008974 A | 1/1999 |
| JP | 2000295842 A | 10/2000 |

OTHER PUBLICATIONS

Kohama et al; "Abnormal Phenomena Caused by Synchronous Rectifiers in Parallel–Module DC–DC Converter System"; IEEE, 1998, pp. 1230–1236 No Date.

* cited by examiner

Primary Examiner—Rajnikant B. Patel
(74) Attorney, Agent, or Firm—Akerman Senterfitt

(57) ABSTRACT

A switching power supply for preventing the inflow of an electric current from an external when it stops operating. A transistor 32 is connected between a gate of a MOSFET 11 and a first terminal of a secondary winding 7 where a positive voltage is induced when a switching element 8 turns on. A Zener diode 33 is connected to a base of the transistor 32. When the switching element 8 is in an on state, the Zener diode 33 turns on the transistor 32 by a voltage Vson generated in the first terminal of the secondary winding 7, thereby supplying the voltage Vson to the gate of the MOSFET 11.

17 Claims, 16 Drawing Sheets

SWITCHING POWER SUPPLY

BACKGROUND OF THE INVENTION

1. Field of Invention

The present invention relates to a synchronous rectifying switching power supply for turning on or off a rectifying switch element and/or a free-wheeling switch element on the secondary side of a transformer, synchronously with a switching element.

2. Description of the Related Art

In a conventional DC/DC converter in which a DC input voltage is intermittently applied to a primary winding of a transformer through a high-frequency switching action of a main switching element, so that an AC voltage induced in a secondary winding of the transformer is rectified by a rectifying element to thereby obtain a DC output voltage, a circuit topology such that a MOSFET is used as a rectifying element or a free-wheeling element provided on the secondary side of the transformer so that the MOSFETs are turned on or off synchronously with the switching action of the main switching element, has been well recognized by those skilled in the art as an effective means for reducing power loss in the circuit elements. However, if a parallel running is performed by connecting several (two, for example) synchronous rectifying DC/DC converters to a common load, the following problems occur.

That is, if the loads in the respective DC/DC converters were well balanced but an output voltage in a second DC/DC converter rises for some reason such as load change, a first DC/DC converter allows its built-in control circuit to detect such rise in the output voltage to thereby control for lowering the output voltage, i.e., for narrowing a pulse conduction width of the main switching element. If such control reaches a limit, the main switching element stops operating, so that the output voltage is applied from the operating second DC/DC converter to the output circuit of the non-operating first DC/DC converter, and thus the gate of the rectifying MOSFET is forward biased, thereby resulting in the turning on of the MOSFET. Then, the electric current is allowed to flow into the secondary winding of the transformer from the second DC/DC converter through the MOSFET, so that a core of the transformer gets saturated and thus the secondary winding gets into a state of substantial short circuit, which allows further strong current to flow in the MOSFET, thereby occasionally damaging the MOSFET. On the other hand, the first DC/DC converter continues receiving the current from the second DC/DC converter, so that the rectifying and free-wheeling MOSFETs start self-oscillation, thus causing, though it depends on cases, failures in the elements due to the heat generated thereby.

FIG. 9 is a circuit diagram showing a specific example of such conventional parallel running switching power supply. In FIG. 9, reference numerals 1A, 1B . . . designate DC/DC converters connected in parallel and 3 a DC power source for supplying a DC input voltage Vi to the respective DC/DC converters 1A, 1B . . . , wherein the respective DC/DC converters have the same circuit topology. In the respective DC/DC converters 1A, 1B . . . , reference numeral 5 designates a transformer of which the primary and the secondary sides are isolated from each other. Reference numeral 8 designates a main switching element such as a MOSFET which is connected in series with the primary winding 6 of the transformer 5. The main switching element 8 turns on or off so that the DC input voltage Vi is intermittently applied to the primary winding 6 of the transformer 5 so as to take out AC voltage from the secondary winding 7 of the transformer 5.

Across the primary winding 6 is connected an active clamp circuit 71 comprising a series circuit of an auxiliary switching element 9 including a MOSFET and a capacitor 10. The main switching element 8 and the auxiliary switching element 9 are turned on or off alternately, defining an off period or dead time, respectively. Thus, the magnetizing inductance of the transformer 5, parasitic capacitance of the respective switch elements 8, 9 (see FIG. 10) are allowed to resonate, thereby achieving Zero Voltage Switching at the time of the turn-on and turn-off of the switching elements 8, 9. In the meantime, reference numeral 72 designates a body diode which is connected in parallel with reverse polarity across the drain and the source of the switching element 8. Likewise, 73 also a body diode which is connected in parallel with reverse polarity across the drain and the source of the auxiliary switching element 9.

A MOSFET 11 serving as a rectifying element is connected in series with the secondary winding 7 of the transformer 5, while a MOSFET 22 serving as a free-wheeling element is connected between the series circuit of the secondary winding 7 and the MOSFET 11. The gate of the MOSFET 11 is connected to a dotted side terminal of the secondary winding 7 where a positive voltage is induced when the main switching element 8 turns on, while the gate of the MOSFET 22 is connected to a non-dotted side terminal of the secondary winding 7 where a positive voltage is induced when the main switching element 8 turns off. A series circuit of a choke coil 13 and a smoothing capacitor 14 is connected across the MOSFET 22. By turning on or off the MOSFETs 11 and 12 synchronously with the main switching element 8, an AC voltage generated in the secondary winding 7 of the transformer 5 is rectified, which is further smoothed by the choke coil 13 and the smoothing capacitor 14, whereby a DC output voltage Vo can be obtained from both terminals of the smoothing capacitor 14. In the meantime, reference numerals 75 and 76 designate body diodes each of which is connected in parallel with reverse polarity across the drain and the source of the MOSFETs 11 and 22.

Reference numeral 17 designates a control circuit for monitoring the DC output voltage Vo and varying a pulse conduction width of a drive signal to be supplied to the gate of the main switching element 8 or the auxiliary switching element 9, corresponding to the change in the DC output voltage Vo, thereby stabilizing the DC output voltage Vo through the feedback by the control circuit 17.

FIG. 10 is a circuit diagram of the DC/DC converter 1A which ceased operating due to the difference in output voltage Vo in the parallel running switching power supply of FIG. 9. Here, parasitic capacitances 82 to 85 of the respective switching elements 8, 9 and the MOSFETs 11 and 12 are taken into consideration. Each switching element 8, 9 on the primary side of the transformer 5 is in a completely off-state. The main switching element 8 is connected to a parallel circuit of the body diode 72 and the parasitic capacitance 82, while the auxiliary switching element 9 is connected to a parallel circuit of the body diode 73 and the parasitic capacitance 83, respectively. Further, the second DC/DC converter 1B for supplying the output voltage Vo, which equivalently serves as a voltage source 87, is connected to the secondary side of the transformer 5.

In a state illustrated in FIG. 10, the MOSFETs 11 and 12 start self-oscillation, through Stages 1 to 4 shown in waveform diagrams of FIG. 11. In the waveform diagrams of FIG.

11, the uppermost waveform indicates a drain-source voltage VSR1 of the MOSFET 11, and the next waveform immediate therebelow indicates a drain-source voltage VSR2 of the MOSFET 22, then a inductor current iL flowing through the choke coil 13, and an magnetizing current iLm flowing in the secondary winding 7 of the transformer 5, in sequence.

FIG. 12 shows the equivalent circuit for State 1. Reference Numeral 91 designates a combined capacitance on the primary side of the transformer 5. If the capacitance of the respective parasitic capacitances 82, 83 are denoted by CQ1, CQ2, while the turn ratio of the primary winding 6 to the secondary winding 7 is n:1, then the composed capacitance equals $n^2(CQ1+CQ2)$. Further, reference numeral 92 designates a magnetizing inductance of the transformer 5. The State 1 begins after the free-wheeling MOSFET 22 turns on and the rectifying MOSFET 11 turns off. The main switching element 8 and the auxiliary switching element 9 are in an off state. The Voltage VSR1 across the MOSFET 11 is of a sinusoidal waveform due to the resonance associated with a magnetizing inductance 92 and parasitic capacitances 82, 83 and 84.

On the other hand, the inductor current iL in the choke coil 13 decreases linearly, as the free-wheeling MOSFET 22 is in an on state. State 1 ends as the voltage VSR1 across MOSFET 11 decreases to Zero, and then Stage 2 starts.

The equivalent circuit for State 2 is shown in FIG. 13.

The state begins after the MOSFET 11 turns on and the MOSFET 22 turns off. The voltage VSR2 across the MOSFET 22 rises in the slope of a sinusoidal waveform due to the resonance associated with the inductance of the choke coil 13 and parasitic capacitances 82, 83 and 85. The state 2 ends as the voltage VSR2 across the MOSFET 22 becomes Vi/N, and then State 3 starts.

The equivalent circuit for State 3 is shown in FIG. 14.

State 3 begins after the body diode 72 of the switching element 8 turns on to clamp the voltage VSR2 at Vi/N. Reference numeral 93 denotes an equivalent voltage source at that moment. In State 3, the magnetizing current iLm and the inductor current iL increase linearly. The state ends when iL+iLm>0, which results in turning off the body diode 73, and then State 4 starts.

FIG. 13 shows the equivalent circuit for State 4. This circuit is the same as in State 2 except for initial conditions. Whilst the MOSFETs 11 and 22 continue the self-oscillation through the foregoing four stages, this self-oscillation may generate voltage stresses in the MOSFETs 11 and 22, which may result in the degradation of the MOSFETs 11 and 22. Moreover, the self-oscillation frequency is different from the switching frequency. This results in some interference between DC/DC converters 1A and 1B.

A circuit topology for preventing the rectifying MOSFET 11 from turning on during the stop of operation is proposed in for example Japanese Un-Examined patent publication No. 11-8974. The conventional circuit topology is shown in FIG. 15, in which the free-wheeling diode 12 is connected between the series circuit of the secondary winding 7 and the MOSFET 11. Further, a series circuit of the choke coil 13 and the smoothing capacitor 14 is connected across the free-wheeling diode 12, and thus the MOSFET 11 turns on or off synchronously with the switching element 8, thereby rectifying the AC voltage Vs generated in the secondary winding 7 of the transformer 5, and then further smoothing the thus rectified output voltage by the choke coil 13 and the smoothing capacitor 14, whereby a DC output voltage Vo is obtained from both terminals of the smoothing capacitor 14.

It is noted that this conventional circuit is featured by the Zener diode 21 connected in series with the gate of the MOSFET 11. This Zener diode 21 is of such a characteristic that it conducts relative to the "on" voltage Vson generated in the secondary winding 7 while it does not conduct relative to the output voltage Vo. Thus, even though the first DC/DC converter 1A is not operating, the rectifying MOSFET 11 is not turned on by the output voltage Vo from the second DC/DC converter 1B. Accordingly, it is possible to prevent the electric current from flowing from the second DC/DC converter 1B through the MOSFET 11 into the secondary winding 7 of the transformer 5, thereby avoiding the damage of the MOSFET 11 caused by the saturation of a core of the transformer 5

In recent years, however, needs for DC/DC converters which can meet a wide range of input voltage Vi have been increased on the market. According to the conventional circuit shown in FIG. 15, however, the gate-source voltage Vgs of the rectifying MOSFET 11 varies so sharply that it is difficult to meet such wide-ranging tendency of input voltage Vi.

As follows is a more detailed description of the above problem based on a waveform diagram of FIG. 16. If the turn ratio of the primary winding 6 to the secondary winding 7 of the transformer 5 is denoted by N: 1, and the Zener voltage of the Zener diode is denoted by Vz, then the voltage Vs generated in the secondary winding 7 and the gate-source voltage of the MOSFET 11 are each as shown in FIG. 16. In the meantime, symbol "Ton" in FIG. 16 denotes an on or conducting period of the switching element 8, while "Toff" an off or non-conducting period thereof.

Specifically, as the switching element 8 is short-circuited between the drain and the source thereof during the on period (Ton) of the switching element 8, the voltage generated in the secondary winding 7 equals the input voltage Vi times the turn ratio of the primary winding 6 (Vson=Vi/N). Further, the gate-source voltage Vgson of the MOSFET 11 at this point equals the voltage Vson minus the Zener voltage Vz (Vgson =Vi/N−Vz).

Assuming that the input voltage Vi=100 V, turn ratio N=5, and Zener voltage Vz=17 V, then the gate-source voltage Vgson of the MOSFET 11 becomes 3 V. If the respective DC/DC converters 1A, 1B . . . shall correspond to 150 V input voltage Vo, then the gate-source voltage Vgson of the MOSFET 11 becomes 13 V, which in turn means that if the input voltage Vi is increased to 1.5 times an initial value, then the gate-source voltage Vgson of the MOSFET 11 also is increased to as much as 4.3 times an initial value thereof, thus resulting in an extremely large fluctuation. Accordingly, there occurs a problem that if the input voltage Vi is raised, a MOSFET with the existing withstand voltage characteristic cannot be used as it is, thus leading to difficulties in meeting widely ranging input voltage Vi.

SUMMARY OF THE INVENTION

To eliminate the above-mentioned problems, it is, therefore, a primary object of the present invention to provide a switching power supply that can meet wide-ranging input voltage.

It is another object of the invention to provide a parallel running switching power supply which can prevent the self-oscillation of a rectifying element or a free-wheeling element during the stop of operation.

It is another object of the invention to provide a switching power supply which can reduce on-resistance of the rectifying element during the operation, while the rectifying element is prevented from turning on even against output voltage applied from the external during the stop of operation. It should be noted that a technical goal of the invention common with the above-mentioned objects is to prevent the inflow of electric current from the external when the power supply is not operated.

To attain the above objects, a switching power supply of the invention proposes to include a switch element which is connected between a control terminal of a rectifying switch element and a first terminal of a secondary winding where a positive voltage is induced when the switching element turns on; and a voltage regulation element for turning on the switch element by the voltage induced on the first terminal of the secondary winding when the switching element turns on so as to supply the voltage to the control terminal of the rectifying switch element.

When the switching element turns on while the DC/DC converter is operating, a positive voltage is induced on the first terminal of the secondary winding of the transformer. A this moment, the terminal voltage of the voltage regulation element is equal to the voltage across the secondary winding, but becomes higher than a regulation voltage of the voltage regulation element, so that the switch element turns on to thereby apply the voltage across the secondary winding to the control terminal of the rectifying switch element. Thus, the rectifying element turns on immediately so that the power loss can be reduced.

On the other hand, when the output voltage is applied from the external to the output circuit of the non-operated DC/DC converter, the terminal voltage across the switch element is equal to the output voltage and does not reach the regulation voltage of the voltage regulation element, and thus the rectifying element is not turned on. Accordingly, it s possible to prevent the electric current from flowing through the rectifying element of the non-operated DC/DC converter into the secondary winding of the transformer.

Moreover, the voltage across the control terminal of the rectifying element during the on period of the switching element is not affected by the regulation voltage of the voltage regulation element, but only depends upon the voltage across the secondary winding of the transformer. For this reason, even though the input voltage is varied in a widely ranging manner, the voltage across the control terminal of the rectifying switch element is only varied at the same rate, so that the rectifying switch element with the existing withstand voltage characteristic can be easily used as it is.

According to another embodiment of the invention, a switching power supply of the invention proposes to include a switch element which is connected between a control terminal of the rectifying switch element and a first terminal of the secondary winding where a positive voltage is induced when the switching element turns on; a first voltage regulation element for level shifting the voltage induced in the first terminal of the secondary winding during an on period of the switching element, and then applying it to the control terminal of the rectifying switch element; and a second voltage regulation element for defining a maximum voltage level to be applied to the control terminal of the rectifying switch element.

In this case also, when the switching element turns on while the DC/DC converter is operating, positive voltage is developed at the first terminal of the secondary winding of the transformer. At this moment, the voltage across the switch element is equal to the voltage across the secondary winding, but becomes higher than the regulation voltage of the first voltage regulation element, so that the switch element turns on to thereby apply the voltage across the secondary winding to the control terminal of the rectifying switch element with the voltage being level-shifted. Thus, the rectifying switch element turns on immediately so that the power loss as a switching element can be reduced.

On the other hand, if the output voltage is applied from the external when the DC/DC converter is non-operated, the voltage across the switch element is equal to the output voltage and does not reach the regulation voltage of the first voltage regulation element, the rectifying switch element does not turn on. Accordingly, it s possible to prevent the electric current from flowing into the secondary winding of the transformer through the rectifying switch element.

Moreover, when the input voltage is raised in a wide range, a maximum voltage across the rectifying element is defined by the second voltage regulation element, so that the rectifying switch element with the existing withstand voltage characteristic can be easily used as it is. Accordingly, it is able to easily meet widely ranging input voltage while preventing the inflow of electric current.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF THE PREFERRED EMBODIMENTS

Figure 5:
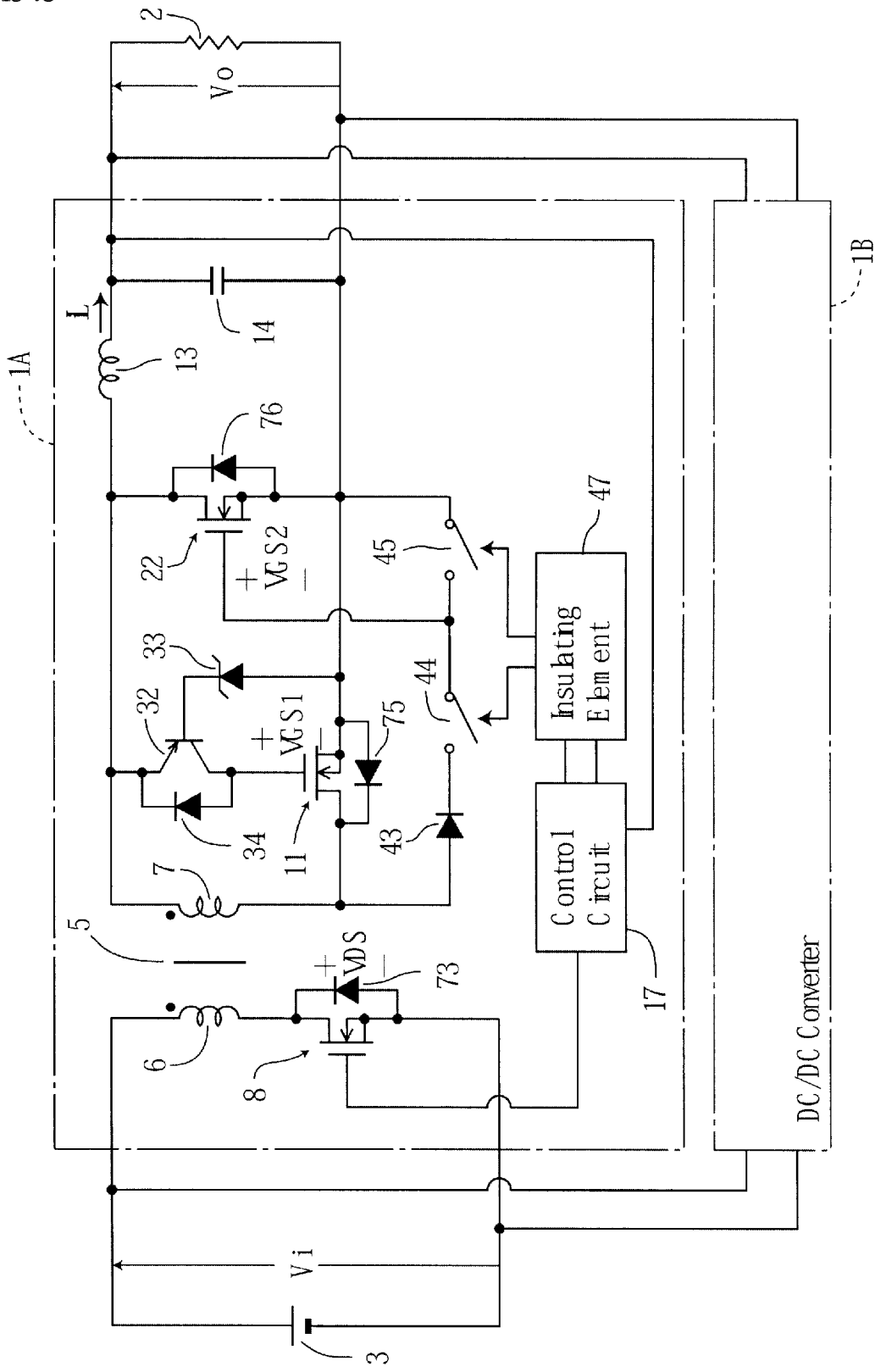
FIG. 5 is a circuit diagram showing a switching power supply according to a third embodiment of the invention.

Hereunder is a description of preferred embodiments of the present invention based on the attached drawings. In these drawings, the same portions as those illustrated in FIG. 5 in the foregoing prior art paragraph will be designated by the same reference numerals, and their repeated detailed description will be omitted.

Figure 1:
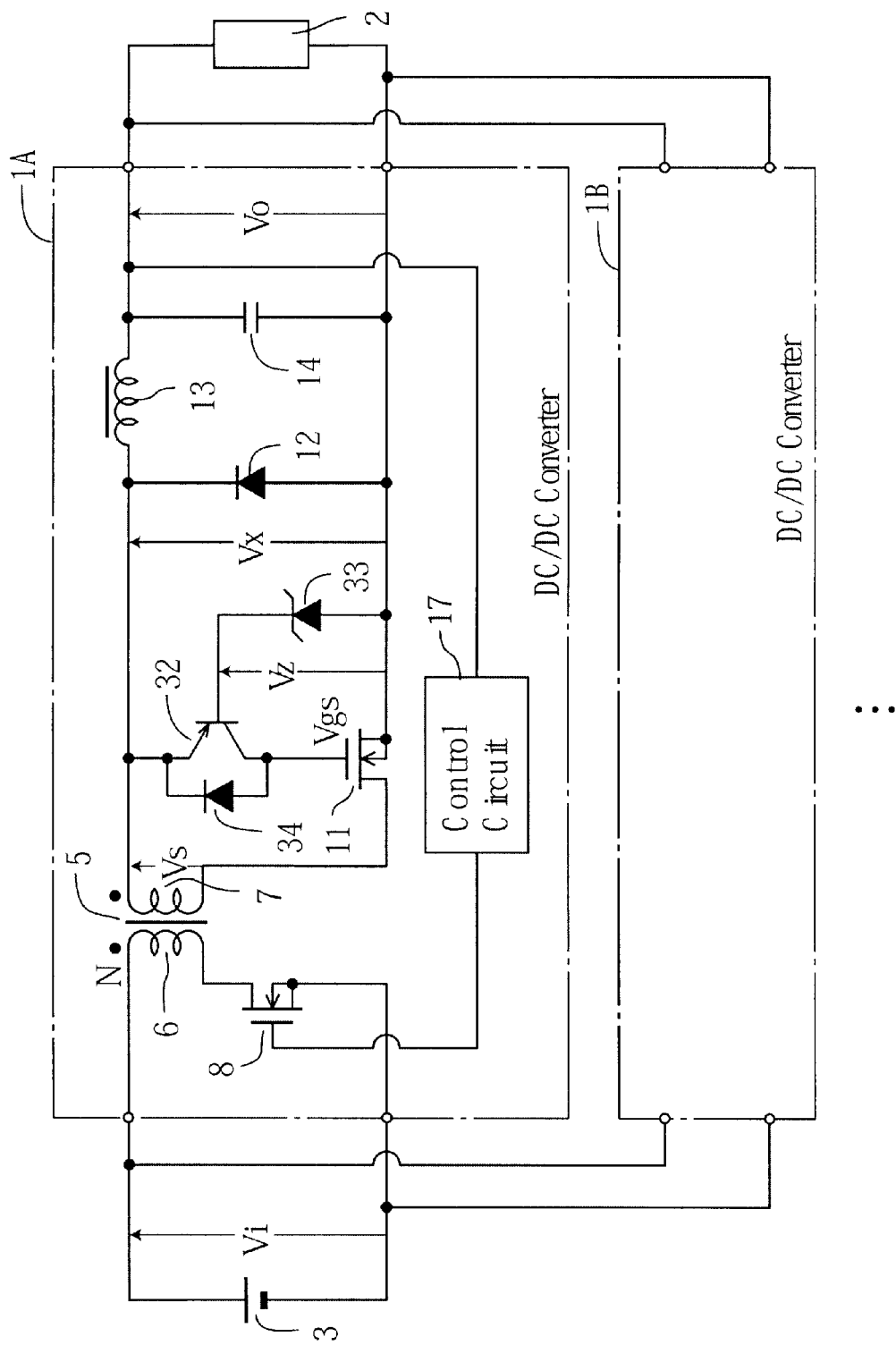
FIG. 1 is a circuit diagram of a switching power supply according to a first embodiment of the present invention.

FIG. 1 shows a circuit diagram of a preferred switching power supply in accordance with a first embodiment of the invention. In FIG. 1, a rectifier element provided on the secondary side of the transformer 5 of the present embodiment comprises the aforesaid MOSFET 11 for synchronous rectifying; a PNP transistor 32 serving as a switch element connected between the gate of the MOSFET 11 and the dotted terminal of the transformer 5 in which positive voltage is developed when the switching element 8 turns on; and a Zener diode 33 serving as a voltage regulation element connected to the control terminal or base of the transistor 32 and the source of the MOSFET 1. The Zener diode 33 turns off the transistor 32 when the terminal voltage or emitter voltage Vx of the transistor 32 connected to the dotted terminal of the secondary winding 7 is below the Zener voltage Vz, on the basis of the source of the MOSFET 11, while it turn on the transistor 32 when the emitter voltage Vx reaches the Zener voltage Vz. Herein, the Zener diode 33 is so selected that it may have a characteristics of having a Zener voltage Vz which is lower than the on-voltage Vs developed in the secondary winding 7 of the transformer 5 but is higher than the output voltage Vo. Reference numeral 34 designates a diode which is connected in reverse parallel between the emitter and the collector of the transistor 32, said diode 34 serving to discharge electric charge stored in the gate when the MOSFET 11 turns off. Other circuit topology is the same as that of prior art shown in FIG. 5.

Figure 2:
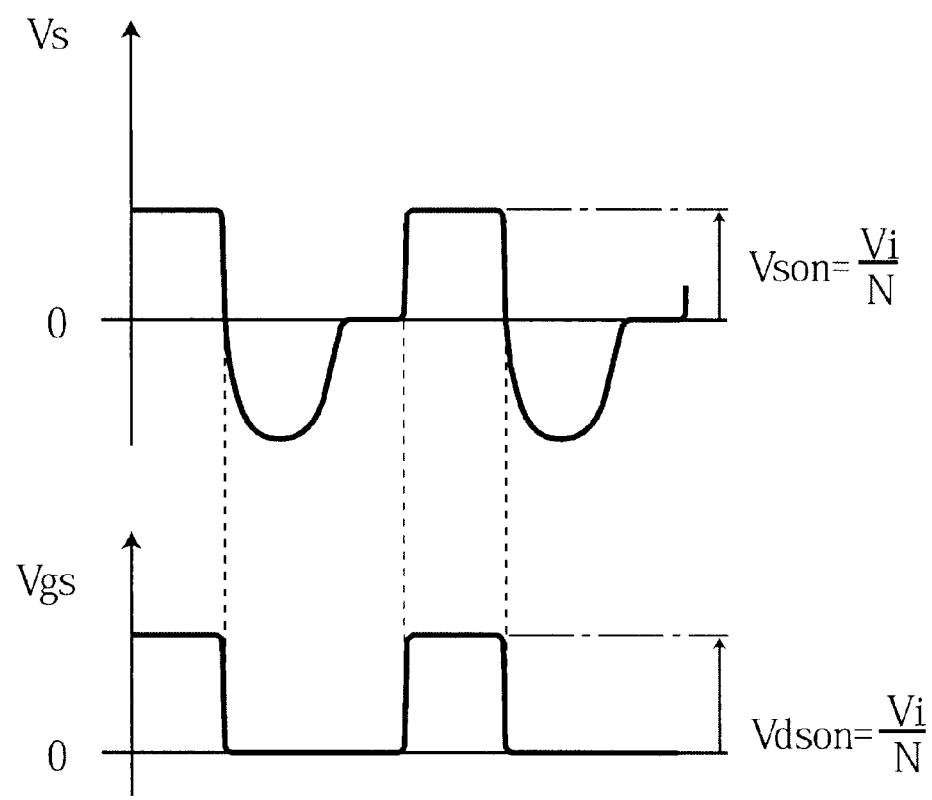
FIG. 2 is a waveform diagram showing a voltage in the secondary winding of a transformer, and a gate-source voltage of a MOSFET in FIG. 1.

Next, the action of the above-structured switching power supply is described with reference to waveform diagrams shown in FIG. 2. In FIG. 2, an upper waveform illustrates a voltage Vs developed in the secondary winding 7 of the transformer 5, while a lower waveform illustrates a gate-source voltage Vgs (across the gate and source of the MOSFET 11).

DC/DC converters 1A, 1B . . . of the present embodiment are forward converters for control of pulse width. When the DC/DC converter 1A is operating, the switching element 8 turns on or off to thereby intermittently apply DC input voltage Vi to the primary winding 6 of the transformer 5, so that AC voltage is developed in the secondary winding 7 of the transformer 5. During the on period (Ton) of the switching element 8, DC input voltage Vi from the DC power source 3 is applied to the primary winding 6 of the transformer 5, thus generating on-voltage Vs on(=Vi/N) on the dotted side terminal of the secondary winding 7, in proportion to the turn ratio (1/N) relative to the primary winding 6. At this moment, as the emitter voltage Vx of the transistor 32 becomes equal to the on-voltage Vs in the secondary winding 7 but becomes higher than the Zener voltage Vz of the Zener diode 33, the Zener diode 33 is allowed to conduct to thereby turn on the transistor 32, so that the gate-source voltage Vgson of the MOSFET 11 becomes equal to the on-voltage Vs on in the secondary winding 7(Vgson=Vi/N). Accordingly, the MOSFET 11 turns on immediately synchronously with the switching element 8 so that the power loss as a rectifier element can be reduced, while the on-voltage Vson developed in the secondary winding 7 of the transformer 5 is rectified by the MOSFET 11, thus supplying energy to a choke coil 13 and a load 2.

When the switching element 8 is turned into an off-period (Toff), positive voltage is then developed at a non-dotted side terminal of the secondary winding 7 due to reset voltage developed in the primary winding 6 of the transformer 5. As the emitter voltage Vx of the transistor 32 falls below the Zener voltage Vz of the Zener diode 33, not only the transistor 32 but also the MOSFET 11 turns off, which in turn turns on a free-wheeling diode 12. Thus, inertial current flowing through the choke coil 13 is kept on being supplied as energy to the load 2. A smoothing capacitor 14 absorbs ripples of the output voltage Vo, while a control circuit 17 supplies drive signals to the gate of the switching element 8, and at the same time detects the change of the output voltage Vo to vary pulse on-width of the drive signals, thereby stabilizing the output voltage Vo.

If the output voltage Vo of a second DC/DC converter 1B rises for some reason, aforesaid first DC/DC converter 1A allows a control circuit 17 thereinside to detect such rise of the output voltage Vo to thereby control so as to narrow the pulse on-width of the switching element 8. When such control reaches the limit, the DC/DC converter 1A is changed into a non-operated state, while the output voltage Vo is applied from the active DC/DC converter 1B to the output circuit of the non-operated DC/DC converter 1A. Herein, as the emitter voltage Vx of the transistor 32 is equal to the output voltage Vo but is lower than the Zener voltage Vz of the Zener diode 33, the Zener diode 33 is not allowed so that neither the transistor 32 nor the MOSFET 11 turns on. Accordingly, it is possible to prevent the electric current from flowing from the active DC/DC converter 1B through the MOSFET 11 of the non-operated DC/DC converter 1A into the secondary winding 7 of the transformer 5, thereby avoiding the damage of the MOSFET 11 caused by the saturation of a core of the transformer 5.

What should be noted in the circuit topology of the present embodiment is that the gate-source voltage Vgson of the MOSFET 11 is not affected by the Zener voltage Vz of the Zener diode 33 during the on period of the switching element 8, but only depends upon the voltage Vson across the secondary winding 7 of the transformer 5. In other words assuming a case where input voltage Vi=100 v, turn ratio N=5, and Zener voltage Vz of the Zener diode 33=17 V, like the foregoing example, gate-source voltage Vgson of the MOSFET 11 during the on period of the switching element 8 becomes 20 V which is equal to the voltage Vson across the secondary winding 7. In this case, if the respective DC/DC converters 1A, 1B . . . are made to respond to the input voltage Vi=10 V, then the gate-source voltage Vgson of the MOSFET 11 becomes 30V. As is apparent from the foregoing, even if the input voltage Vi is increased up to 1.5 times, the gate-source voltage Vgson of the MOSFET 11 only increases up to 1.5 times as well, and thus the MOSFET 11 with the existing resistance characteristics can be easily used as it is. Further, even if the aforesaid first DC/DC converter 1A is non-operated during the parallel running, yet the MOSFET 11 for synchronous rectification can be surely kept off by the Zener diode 33. Thus, it is able to easily meet widely ranging input voltage Vi while preventing the flowing of electric current into the non-operated DC/DC converter 1A, by simply adding the transistor 32 serving as a switching element and the Zener diode 33 serving as a voltage regulation element.

According to the present embodiment, there is provided a switching power supply comprising DC/DC converters 1A, 1B . . . in which the switching element 8 connected to the primary winding 6 of the transformer 5 turns on or off to thereby take out AC voltage from the secondary winding 7 of the transformer 5, said AC voltage thus taken out being rectified by the synchronous rectifying MOSFET 11 connected in series to the secondary winding 7 so as to obtain DC output voltage Vi, wherein said switching power supply further comprises the transistor 32 serving as a switching element which is connected between the gate of the MOSFET 11 and the dotted side terminal of the secondary winding 7 where positive voltage is developed when the switching element 8 is on; and the Zener diode 33 connected to the control terminal or base of this transistor, said Zener diode 33 turning on the transistor 32 by the voltage Vson developed at the first terminal of the secondary winding 7 when the switching element 8 is on so as to supply the voltage Vson to the gate of the MOSFET 11.

When the switching element 8 turns on while the DC/DC converter 1A is operating, positive voltage is developed at the first terminal of the secondary winding 7 of the transformer 5. A this moment, the terminal voltage Vx across the transistor 32 is equal to the voltage Vson across the secondary winding 7, but becomes higher than the Zener voltage Vz of the Zener diode 33, so that the transistor 32 turns on to thereby apply the voltage Vson across the secondary winding 7 to the gate-source voltage Vgson of the MOSFET 11. Thus, the MOSFET 11 turns on immediately so that the power loss as a switching element can be reduced.

On the other hand, if the output voltage Vo of the second DC/DC converter 1B rises and the first DC/DC converter 1A is non-operated, the voltage Vo thus raised is applied to the output circuit of the non-operated DC/DC converter 1A. However, as the terminal voltage Vx across the transistor 32 is equal to the output voltage Vo and does not reach the Zener voltage Vz of the Zener diode 33, the MOSFET 11 is not turned on. Accordingly, it s possible to prevent the electric current from flowing through the MOSFET 11 of the non-operated DC/DC converter 1A into the secondary winding 7 of the transformer 5.

Moreover, the gate-source voltage Vgson of the MOSFET 11 during the on period of the switching element 8 is not affected by the Zener voltage Vz of the Zener diode 33, but only depends upon the voltage Vson across the secondary winding 7 of the transformer 5. For this reason, even though the input voltage Vi is varied widely ranging times, the gate-source voltage Vgson of the MOSFET 11 is only varied the same times, so that the MOSFET 11 with the existing voltage resistance characteristics can be easily used as it is. Accordingly, it is able to easily meet widely ranging input voltage Vi while preventing the flowing of electric current into the non-operated DC/DC converter 1A.

Next, a second embodiment of the invention will be described with reference to FIGS. 3 and 4.

Figure 3:
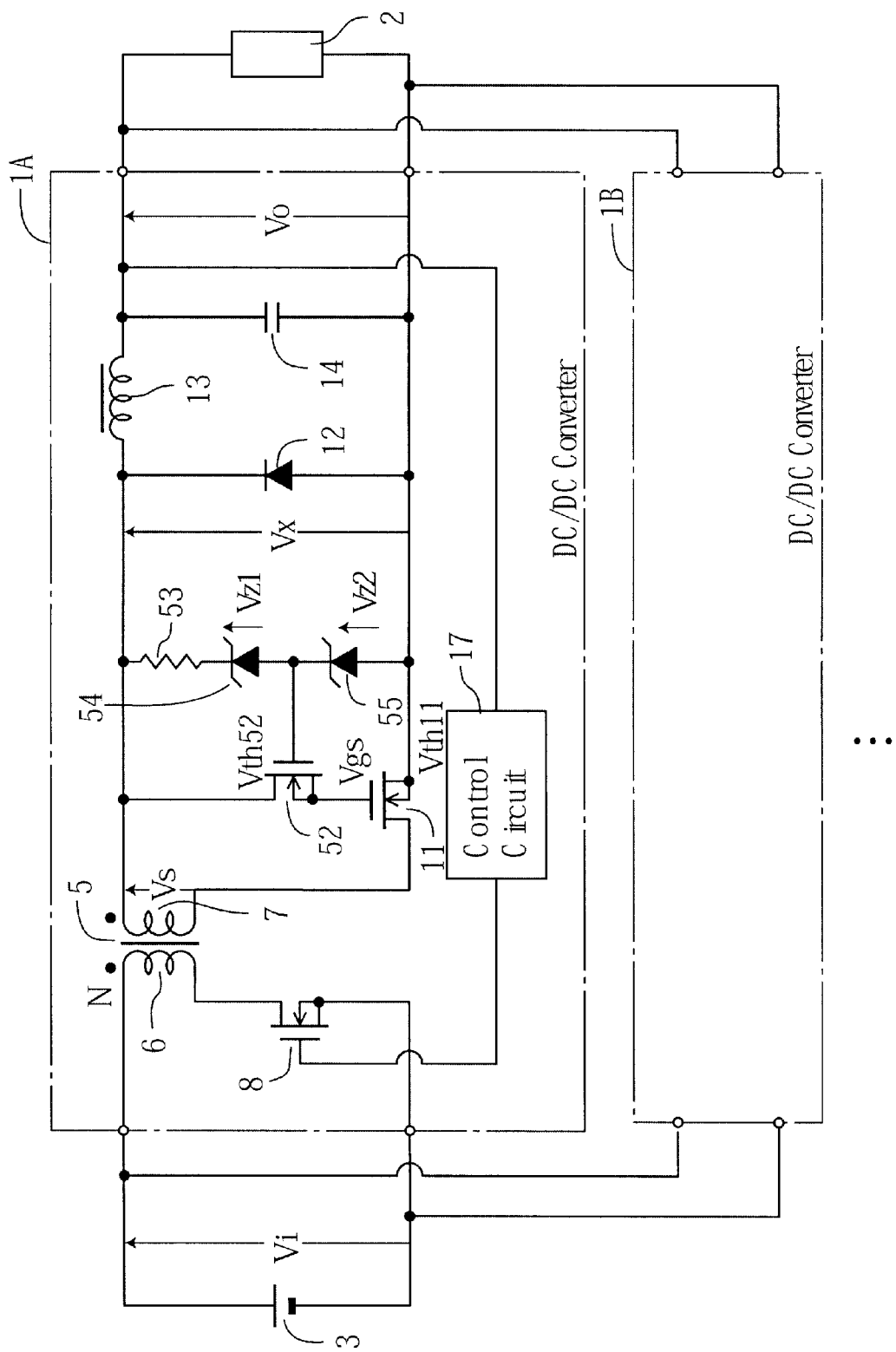
FIG. 3 is a circuit diagram of a switching power supply according to a second embodiment of the present invention.
Figure 4:
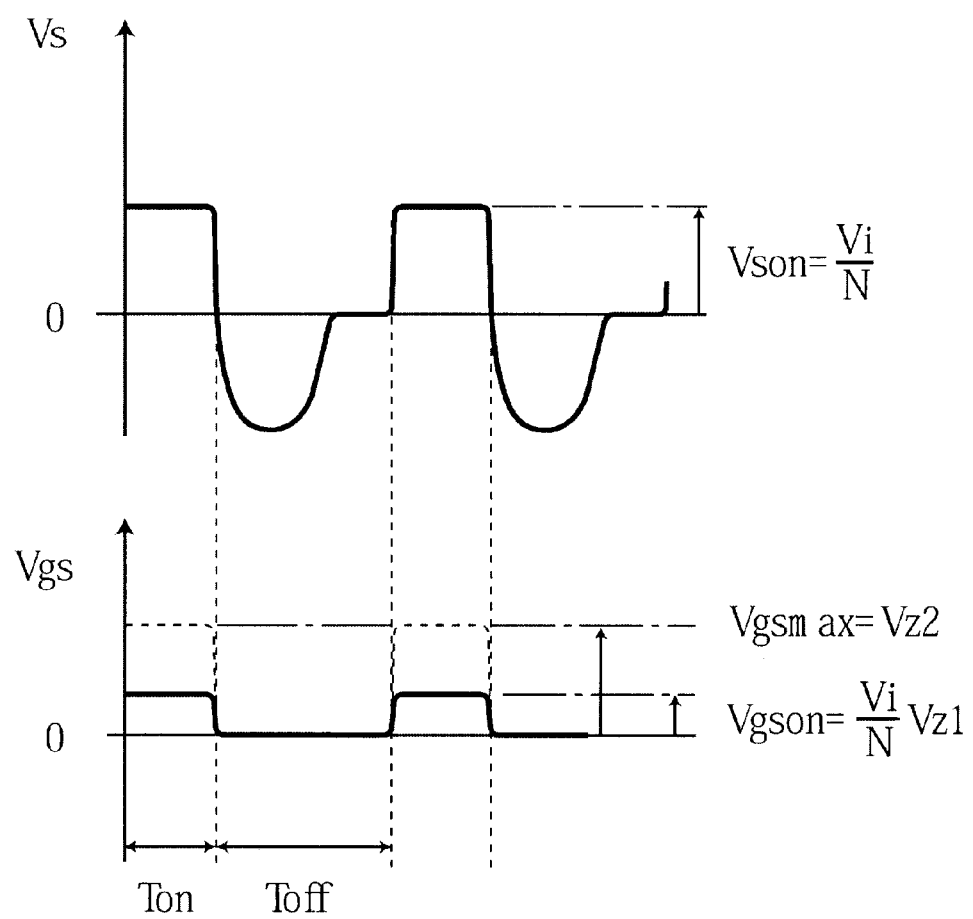
FIG. 4 is a waveform diagram showing a voltage in the secondary winding of a transformer, and a gate-source voltage of a MOSFET in FIG. 3.

In FIG. 3 showing a preferred circuit diagram of the embodiment, the circuit comprises, in addition to the aforesaid MOSFET 11 for synchronous rectifying, a switch element 52 comprising a MOSFET connected between the gate of the MOSFET 11 and the dotted terminal of the transformer 5 in which positive voltage is developed when the switching element 8 turns on; a resistor 53 connected between the source of the MOSFET 11 and the drain of the switch element 52 connected to the dotted terminal of the secondary winding 7; and a series circuit of a Zener diode 54 and a second Zener diode 55, with the connection point of the Zener diodes 54 and 55 being connected to the control terminal or gate of the switch element 52. The first Zener diode 54 turns off the switch element 52 when the terminal voltage Vx across the switch element 52 connected to the dotted side terminal of the secondary winding 7 is below the Zener voltage Vz1, on the basis of the source of the MOSFET 11 on the one hand, while it turns on the switch element 52 when the terminal voltage Vx reaches the Zener voltage Vz 1 on the other hand. Herein, the first Zener diode 54 is so selected that it may have a characteristic of having the Zener voltage Vz1 which is lower than the on-voltage Vs developed in the secondary winding 7 of the transformer 5 but is higher than the output voltage Vo. The second Zener diode 55 is to clamp the maximum gate-source voltage Vgsmax of the MOSFET 11 (see FIG. 4) relative to the Zener voltage Vz2.

Next, the action of the above-structured switching power supply is described with reference to waveform diagrams shown in FIG. 4. In FIG. 4, an upper waveform illustrates a voltage Vs developed in the secondary winding 7 of the transformer 5, while a lower waveform illustrates a gate-source voltage Vgs of the MOSFET 11.

During the on period (Ton) of the switching element 8, DC input voltage Vi from the DC power source 3 is applied to the primary winding 6 of the transformer 5, thus generating on-voltage Vson(=Vi/N) on the dotted side terminal of the secondary winding 7, in proportion to the turn ratio (1/N) relative to the primary winding 6. At this moment, as the terminal voltage Vx across the switch element 52 becomes equal to the on-voltage Vson in the secondary winding 7 but becomes higher than the Zener voltage Vz1 of the Zener diode 54, the Zener diode 54 is allowed to conduct to thereby turn on the switch element 52, so that the gate-source voltage Vgson of the MOSFET 11 becomes equal to the on-voltage Vson in the secondary winding 7 minus the Zener voltage Vz1 of the Zener diode 44 (Vgson=Vi/N−Vz1). Accordingly, the MOSFET 11 turns on immediately synchronously with the switching element 8 so that the power loss as a rectifier element can be reduced, while the on-voltage Vson developed in the secondary winding 7 of the transformer 5 is rectified by the MOSFET 11, thus supplying energy to the choke coil 13 and the load 2.

When the switching element 8 is turned into an off-period (Toff), positive voltage is then developed on a non-dotted side terminal of the secondary winding 7 due to reset voltage developed in the primary winding 6 of the transformer 5. As the terminal voltage Vx across the switch element 52 falls below the Zener voltage Vz1 of the Zener diode 54, not only the switch element 52 but also the MOSFET 11 turns off, which in turn turns on the free-wheeling diode 12. Thus, inertial current flowing through the choke coil 13 is kept on being supplied as energy to the load 2.

If the output voltage Vo of the second DC/DC converter 1B rises for some reason, and the first DC/DC converter 1A is non-operated so that the output voltage Vo is applied from the active DC/DC converter 1B to the output circuit of the non-operated DC/DC converter 1A, then, as the terminal voltage Vx across the switch element 52 is equal to the output voltage Vo but is lower than the Zener voltage Vz1 of the Zener diode 54, the Zener diode 54 is not allowed to conduct so that neither the switch element 52 nor the MOSFET 11 turns on. Accordingly, it is possible to prevent the electric current from flowing from the active DC/DC converter 1B through the MOSFET 11 of the non-operated DC/DC converter 1A into the secondary winding 7 of the transformer 5, thereby avoiding the damage of the MOSFET 11 caused by the saturation of a core of the transformer 5.

What should be noted in the circuit topology of the present embodiment is that when the gate-source voltage Vgson of the MOSFET 11 during the on-period of the switching element 8 rises, in association with the level shifting of the input voltage Vi, then, the gate-source voltage Vgson of the MOSFET 11 is clamped to a certain fixed value when the gate-source voltage Vgson reaches the Zener voltage Vz2 of the Zener diode 55. Namely, as shown in FIG. 4, the maximum gate-source voltage Vgsmax of the MOSFET 11 during the on-period of the switching element 8 is defined by the Zener voltage Vz2 of the Zener diode 55. Accordingly, even if the input voltage Vi is increased at certain rate, the gate-source voltage Vgson of the MOSFET 11 is also increased at the same rate, and thus the MOSFET 11 with the existing resistance characteristics can be easily used as it is.

According to the present embodiment, there is provided a switching power supply comprising DC/DC converters 1A, 1B ... connected in parallel in which the switching element 8 connected to the primary winding 6 of the transformer 5 turns on or off to thereby take out AC voltage from the secondary winding 7 of the transformer 5, said AC voltage thus taken out being rectified by the synchronous rectifying MOSFET 11 connected in series to the secondary winding 7 so as to obtain DC output voltage Vi, wherein said switching power supply further comprises the switch element 52 which is connected between the gate of the MOSFET 11 and the first terminal of the secondary winding 7 where positive voltage is developed when the switching element 8 is on; the Zener diode 54 for level shifting the voltage Vson developed in the first terminal of the secondary winding 7 during the on period of the switching element 8 and then applying the same to the gate of the MOSFET 11; and the second Zener diode 55 for defining the maximum voltage level to be applied to the gate of the MOSFET 11.

When the switching element 8 turns on while the DC/DC converter 1A is operating, positive voltage is developed at the first terminal of the secondary winding 7 of the transformer 5. At this moment, the terminal voltage Vx across the switch element 52 is equal to the voltage Vson across the secondary winding 7, but becomes higher than the Zener voltage Vz1 of the Zener diode 54, so that the switch element 52 turns on to thereby apply the voltage Vson across the secondary winding 7 to the gate-source voltage Vgson of the MOSFET 11 with the voltage Vson being level-shifted. Thus, the MOSFET 11 turns on immediately so that the power loss as a switching element can be reduced.

On the other hand, if the output voltage Vo of the second DC/DC converter 1B rises and the first DC/DC converter 1A is non-operated, then the voltage Vo thus raised is applied to the output circuit of the non-operated DC/DC converter 1A. However, as the terminal voltage Vx across the switch element 52 is equal to the output voltage Vo and does not reach the Zener voltage Vz1 of the Zener diode 54, the MOSFET 11 is not turned on. Accordingly, it s possible to prevent the electric current from flowing into the secondary winding 7 of the transformer 5 through the MOSFET 11 of the non-operating DC/DC converter 1A.

Moreover, when the input voltage Vi is allowed to rise in a wide range, yet the maximum gate-source voltage Vgsmax is defined by the second Zener diode 55, so that the MOSFET 11 with the existing voltage resistance characteristics can be easily used as it is. Accordingly, it is able to easily meet widely ranging input voltage Vi while preventing the flowing of electric current into the non-operated DC/DC converter 1A.

In addition to the foregoing, the present embodiment is particularly advantageous in that for the gate-source voltage Vgson of the MOSFET 11, a voltage shifted to a lower level than the Vson across the secondary winding 7 is applied, thus making it possible to use the MOSFET 11 of the lower withstand voltage than the first embodiment.

In FIG. 3 showing a circuit diagram of a preferred switching power supply in accordance with a third embodiment of the invention, the structures which are different from those of the foregoing embodiments will be explained.

Figure 9:
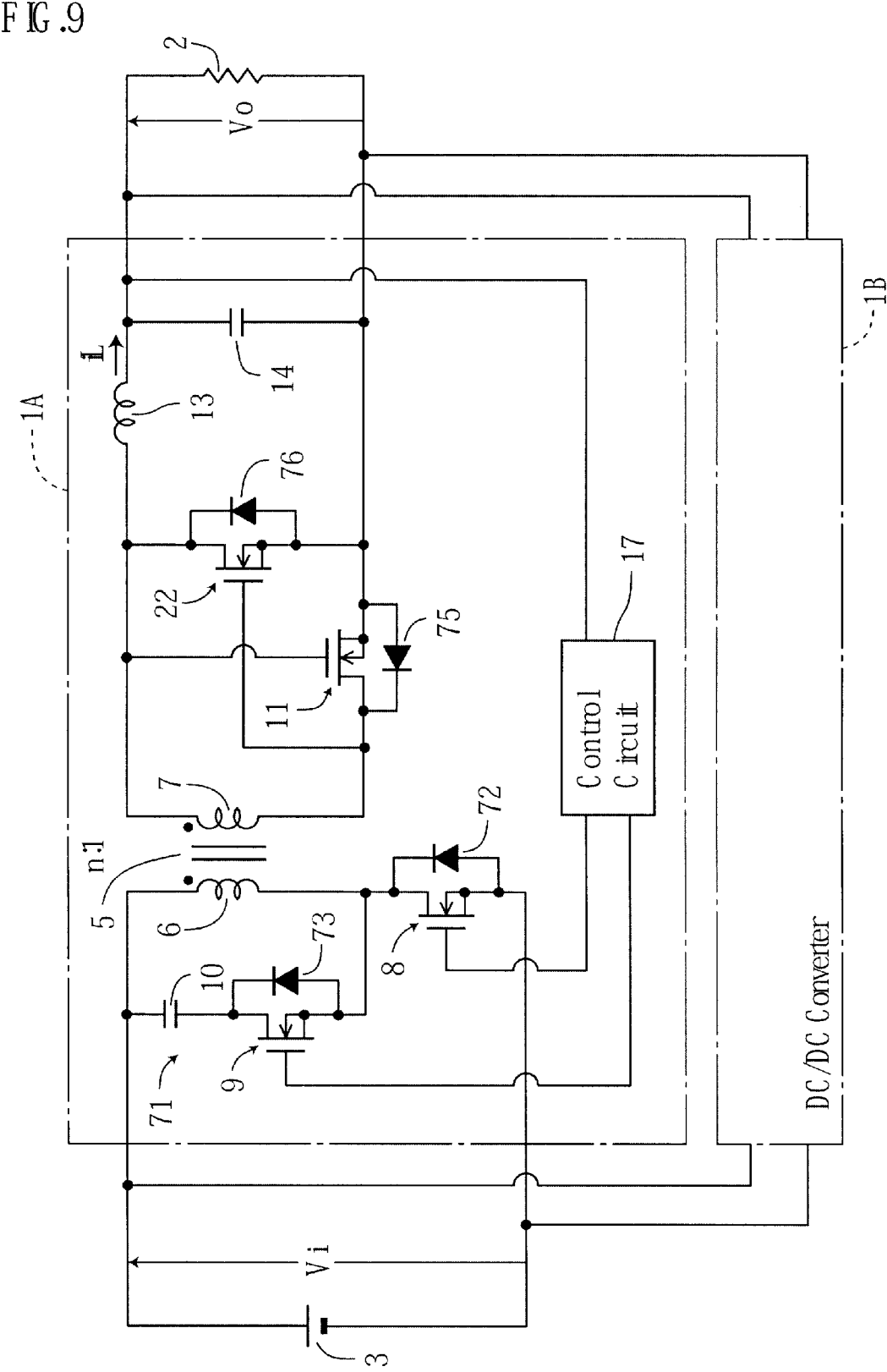
FIG. 9 is a circuit diagram showing one example of a conventional switching power supply.
Figure 10:
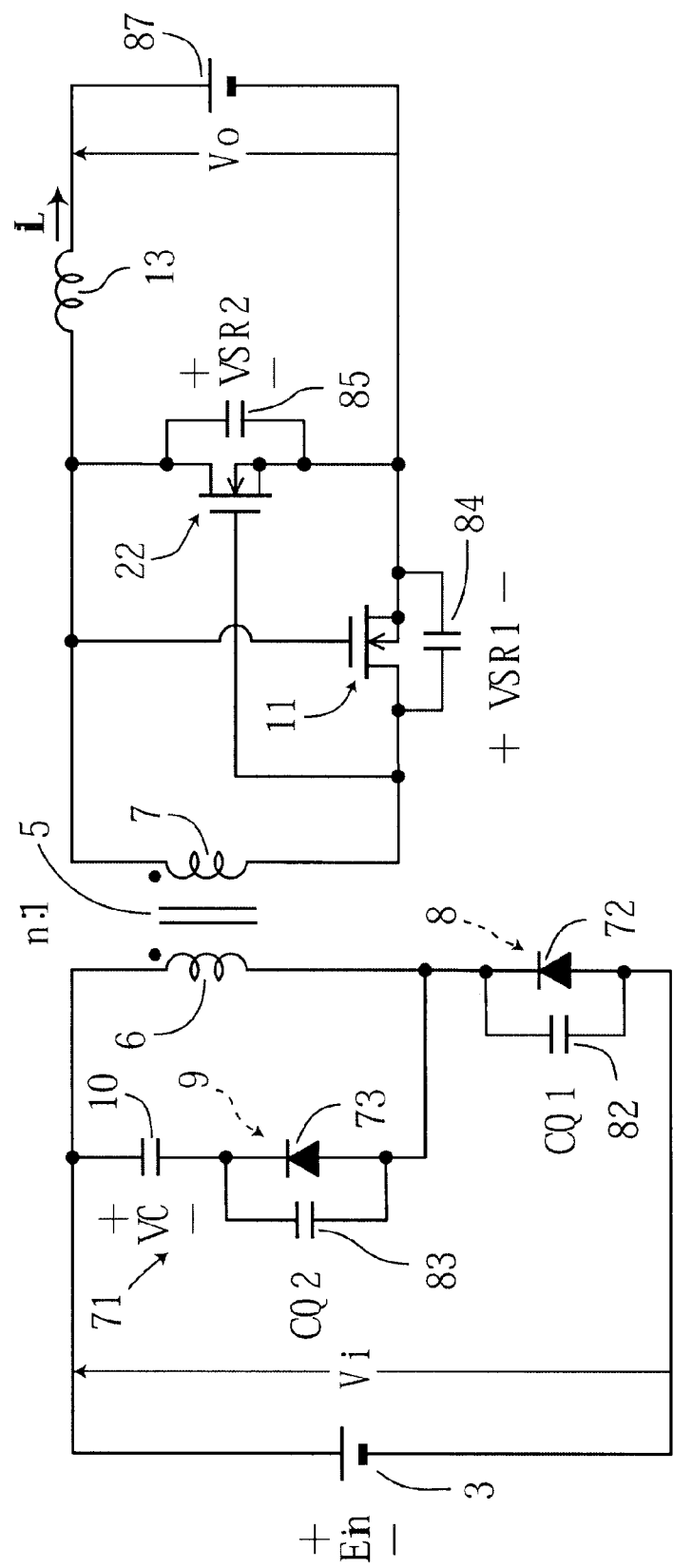
FIG. 10 is a circuit diagram of a conventional DC/DC converter that is in a non-operated state.
Figure 11:
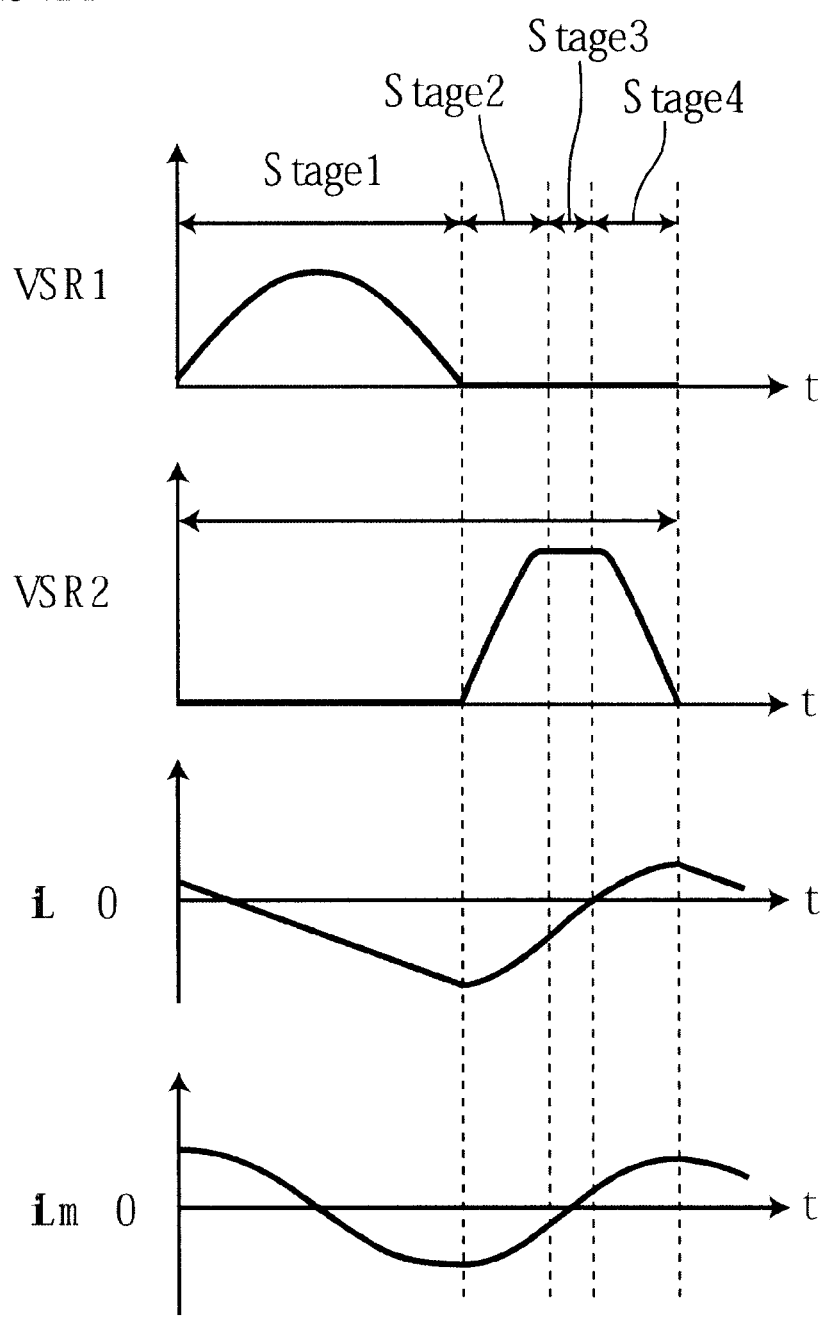
FIG. 11 is a waveform diagram showing respective parts of the conventional one.
Figure 12:
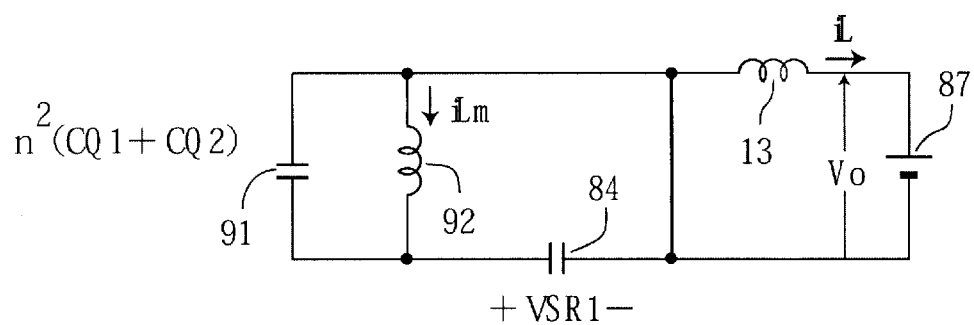
FIG. 12 is an equivalent circuit of the DC/DC converter at stage 1 in FIG. 11.
Figure 13:
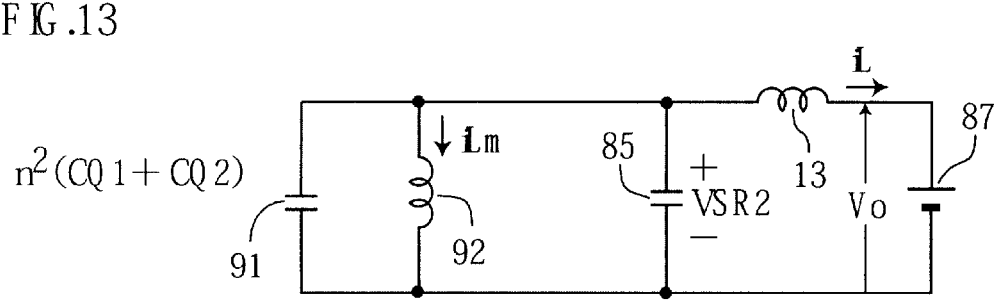
FIG. 13 is an equivalent circuit of the DC/DC converter at stages 2 and 4 in FIG. 11.
Figure 14:
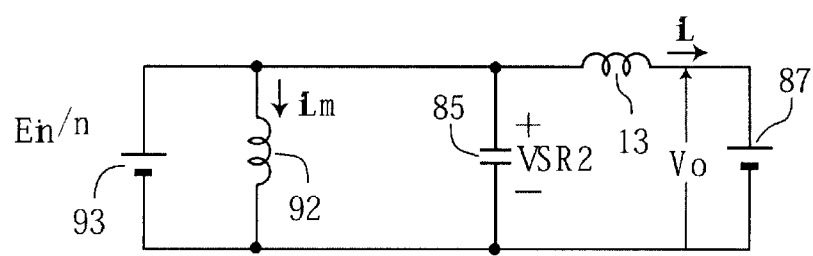
FIG. 14 is an equivalent circuit of the DC/DC converter at stage 3 in FIG. 11.
Figure 15:
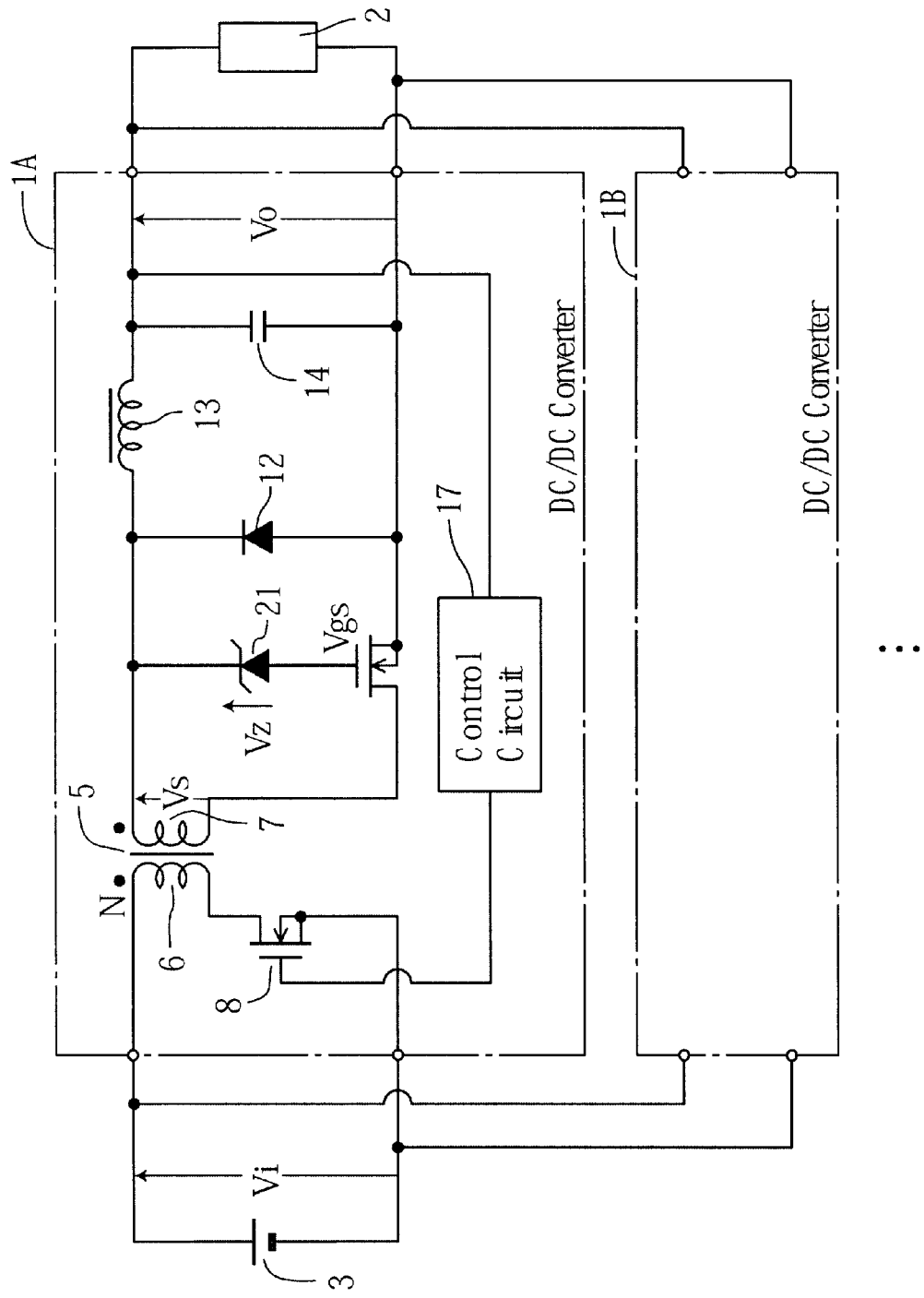
FIG. 15 is a circuit diagram showing another example of a conventional switching power supply.
Figure 16:
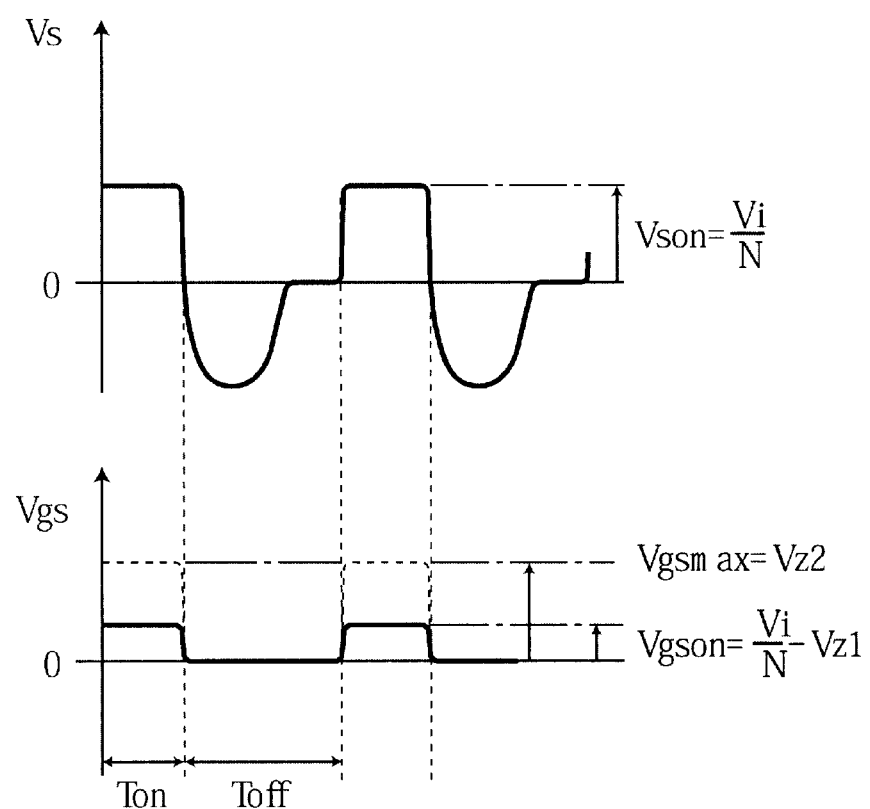
FIG. 16 is a waveform diagram showing a voltage in the secondary winding of a transformer, and a gate-source voltage of a MOSFET in FIG. 15.

In the present embodiment, a free-wheeling MOSFET 22 is used instead of the free-wheeling diode 12 of the first embodiment, of which the gate is not directly connected to the non-dotted side terminal of the transformer 5 but is indirectly connected thereto through a series circuit of a diode 43 and a charging switch element 44. Further, another switch element 45 for discharging purpose is connected between the gate and the source of the MOSFET 22. These switch elements 44 and 45 are connected to the control circuit 17 on the primary side of the transformer 5 in a electrically insulated state through an insulating element 47 such as photocoupler. The control circuit 17 functions to detect pulse drive signals supplied to he gate fo the main switching element 8 to thereby actuate the charging switch element 44 and the discharging switch element 45, respectively. In the present case, it functions to turn off the charging switch element 44 and to turn on the discharging switch element 45 when the main switching element 8 turns on, while it functions to turn on the charging switch element 44 and to turn off the discharging switch element 45 when the main switching element 8 turns off. Further, when the DC/DC converter 1A is non-operated, or when the oscillation of the control circuit 17 is non-operated, both switch elements 44 and 45 are turned off. In the meantime, the active clamp circuit 12 shown in FIG. 9 is omitted in the present embodiment, it of course may be added to the topology of the present embodiment.

Next, the action of the above structure will be described with reference to waveform diagrams in FIG. 6.

Figure 6:
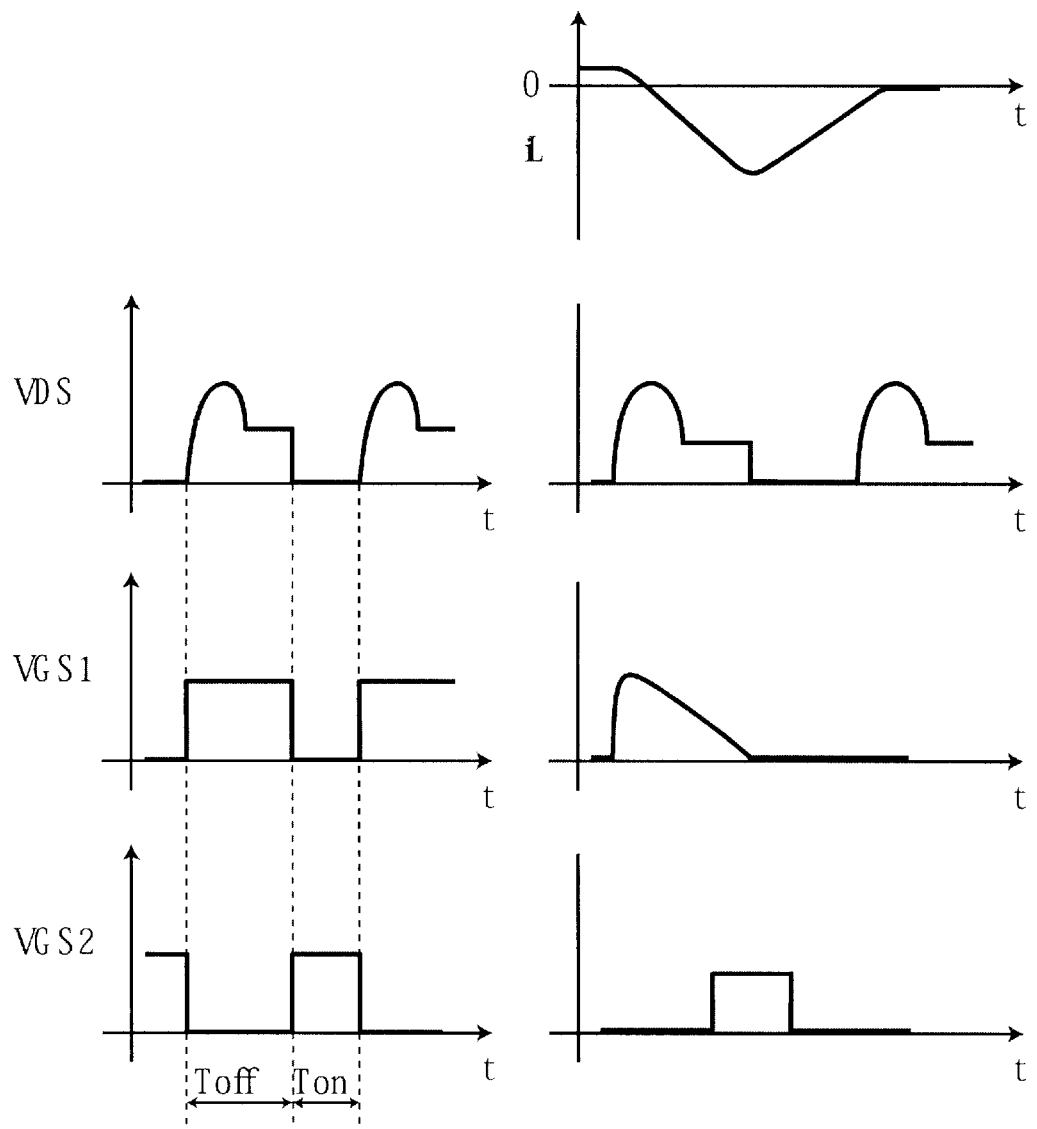
FIG. 6 is a waveform diagram showing respective parts of the switching power supply according to a third embodiment of the present invention.

In FIG. 6, the uppermost waveform shows a inductor current iL flowing through the choke coil 23, and waveforms immediately therebelow show a drain-source voltage VDS, and then followed by a gate-source voltage VGS1 of the MOSFET 11 and the gate-source voltage VGS2 of the MOSFET 22, in sequence. In the same drawing, the left waveforms are those in a steady state, while the right ones are those where the oscillation of the control circuit is stopped.

During the on period (Ton) of the switching element 8, DC input voltage Vi from the DC power source 3 is applied to the primary winding 6 of the transformer 5, thus generating an on-voltage as a positive polarity on the dotted side terminal of the secondary winding 7, in proportion to the turns ratio relative to the primary winding 6. At this moment, the transistor 32 turns on, so that the gate-source voltage VGS1 of the MOSFET 11 becomes equal to the on-voltage in the secondary winding 7, and thus the MOSFET 11 turns on immediately synchronously with the switching element 8, as above discussed. When the switching element 8 is on, the charging switch 44 turns off, while the discharging switch 45 turns on, thereby rapidly discharging the electric charge stored in the gate of the MOSFET 22 until then through the discharging switch 45.

When the switching element 8 is turned into an off-period (Toff), the emitter voltage of the transistor 32 falls below the Zener voltage of the Zener diode 33, not only the transistor 32 but also the MOSFET 11 turns off. At the same time, the control circuit 17 turns on the charging element 44 and turns off the discharging element 45, thereby turning on the free-wheeling MOSFET 22. Thus, inertial current flowing through the choke coil 13 is kept on being supplied as energy to the load 2.

If the output voltage Vo of the second DC/DC converter 1B rises for some reason, and the control circuit 17 stops oscillating so that the first DC/DC converter 1A is non-operated, then the output voltage Vo as a voltage source is applied from the active DC/DC converter 1B to the output circuit of the non-operated DC/DC converter 1A. At this moment, the main switching element 8, charging and discharging switches 44 and 45 are each turned into an off state.

When the control circuit 17 stops oscillating with the reset voltage being developed in the primary winding 6 of the transformer 5, electric charge enough to turn on the MOSFET 22 is stored in the gate of the free-wheeling MOSFET 22 as shown in FIG. 6, and thus the gate-source voltage VGS2 of the MOSFET 22 is gradually decreased due to natural discharge. Further, as the MOSFET 22 is in an on state immediately after the control circuit stops oscillating, the inductor current iL following the energy discharge in the choke coil 13 is permitted to flow in the positive direction. However, the output voltage from the second DC/DC converter 1B soon allows an energy storing inductor current iL to flow in the reverse direction in a linearly increasing manner.

Thereafter, as the electric charge stored in the gate of the MOSFET 22 is discharged naturally, the MOSFET 22 turns off, so that the free-wheeling MOSFET 22 is kept to an off state. Then, due to the energy stored in the choke coil 13 by that time, the choke coil 13 serves as an electromotive force so that the terminal voltage higher than the Zener voltage of the Zener diode 33 is developed in the emitter of the transistor 32. Thus, the rectifying MOSFET 11 turns on and the discharge of energy in the choke coil 13 allows the reverse-directed inductor current iL to be decreased linearly. However, as the free-wheeling MOSFET 22 is kept to an off state and thus no energy is stored in the choke coil 13 again, the MOSFET 11 is not turned on again. Further, the emitter voltage in the transistor 32 falls below the Zener voltage of the Zener diode 33 so that the Zener diode 3 does not conduct. Thus, neither the transistor 32 nor the rectifying MOSFET 11 turns on. Accordingly, it is possible to prevent the electric current from flowing from the active DC/DC converter 1B into the secondary winding 7 of the transformer 5 across the MOSFET 11 of the non-operated DC/DC converter 1A. In this way, the self oscillation of the MOSFETs 11 and 22 during the stoppage of the DC/DC converter 1A can be prevented, while surge voltage developed between the drain and source of the free-wheeling MOSFET 22 can be reduced.

According to the third embodiment, there is provided a switching power supply comprising DC/DC converters 1A, 1B . . . connected in parallel in which the switching element 8 connected to the primary winding 6 of the transformer 5 turns on or off to thereby take out AC voltage from the secondary winding 7 of the transformer 5, said AC voltage thus taken out being rectified and smoothed by the synchronous rectifying MOSFET 11 connected to the secondary winding 7, the free-wheeling MOSFET 22, the smoothing choke coil 13 and a capacitor 14 so as to obtain DC output voltage, wherein said switching power supply further comprises the charging switch element 44 which is connected between the gate of the MOSFET 22 and the first terminal (i.e., non-dotted side terminal) of the secondary winding 7 where positive voltage is developed when the main switching element 8 is off, and wherein said charging switch element 44 turns on during the off period of the switching element 8 when the DC/DC converter 1A is operating, while said charging switch element 44 turns off when the DC/DC converter 1A is non-operated.

Thus, when the switching element 8 turns off during the operation of the DC/DC converter 1A, positive voltage is developed at the non-dotted side terminal of the secondary winding 7 of the transformer 5. A this moment, as the charging switch element 44 turns on, the voltage developed in the secondary winding 7 of the transformer 5 is applied to the gate of the MOSFET 22, so that the MOSFET 22 turns on. Accordingly, the energy stored in the choke coil 13 until that time is fed out to the output side through the MOSFET 22.

On the other hand, if the output voltage Vo of the second DC/DC converter 1B rises and the first DC/DC converter 1A is non-operated, then the voltage Vo thus raised is applied to the output circuit of the non-operated DC/DC converter 1A. However, as the charging switch 44 remains turned off and thus the non-dotted side terminal of the secondary winding 7 of the transformer 5 is disconnected from the gate of the MOSFET 22, the MOSFETs 11 and 22 are prevented from repeating turning on and off, thereby ensuring the preventing of self-oscillation by the MOSFETs 11 and 22.

Figure 7:
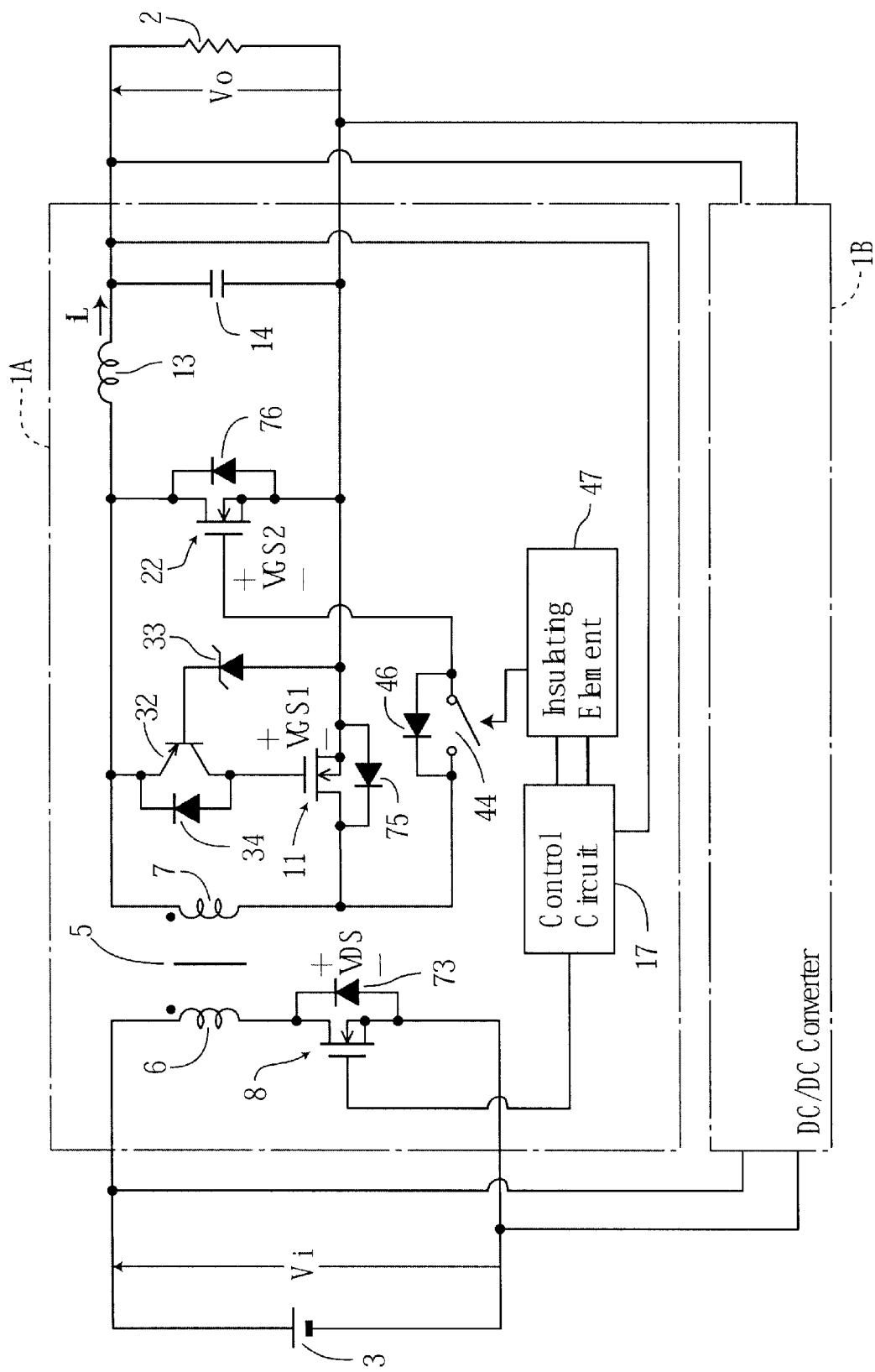
FIG. 7 is a circuit diagram of a switching power supply according to a fourth embodiment of the present invention.

Next, a fourth embodiment of the invention will be described with reference to FIG. 7.

In the fourth embodiment, a discharging diode 46 is connected in parallel with both terminals of the aforesaid charging switch element 44 which is connected between the non-dotted side terminal of the secondary winding 7 of the transformer 5 and the gate of the free-wheeling MOSFET 22.

When the control circuit 17 stops oscillating with the reset voltage being developed in the primary winding 6 of the transformer 5, electric charge enough to turn on the MOSFET 22 is stored in the gate of the free-wheeling MOSFET 22. Unlike the third embodiment, however, as the electric charge is discharged through the diode 46, the gate-source voltage VGS2 of the MOSFET 22 drops so rapidly that the MOSFET 22 turns on promptly. As a result, the increase in the reverse-directed inductor current iL for storing energy in the choke coil 13 becomes smaller, and thus the resultant on period of the rectifying MOSFET 11 becomes short. In this way, the self oscillation of the MOSFETs 11 and 22 during the stoppage of the DC/DC converter 1A can be prevented, while surge voltage developed between the drain and source of the free-wheeling MOSFET 22 can be reduced like the third embodiment.

According to the fourth embodiment, as the diode 46 serving as a discharging element is connected in parallel with both terminals of the charging switch element 44, even though the first DC/DC converter 1A stops operating with the electric charge being stored in the gate of the MOSFET 22, such electric charge is able to be discharged rapidly through the discharging diode 46. Accordingly, it is possible to turn on the MOSFET 22 promptly during the operational stoppage of the DC/DC converter 1A, thereby ensuring the preventing of the self-oscillation by the rectifying or free-wheeling MOSFETs 11 and 22. Alternatively, a resistor may be used as the discharging element of the present embodiment.

Figure 8:
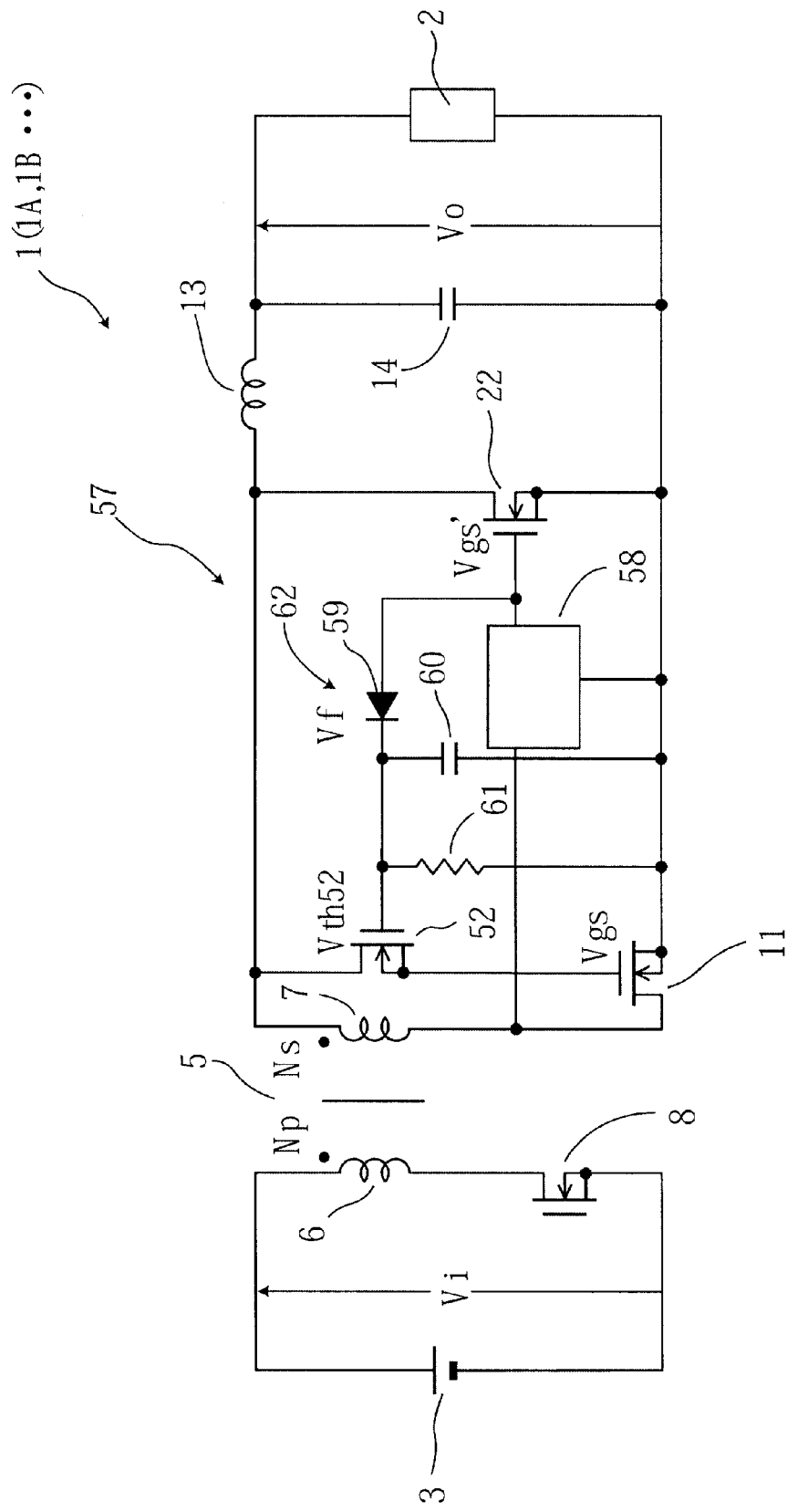
FIG. 8 is a circuit diagram of a synchronous rectifying switching power supply according to a fifth embodiment of the present invention.

In FIG. 8 showing a fifth embodiment of the invention, the number of turns of the primary winding 6 is denoted by Np, while that of the secondary winding 7 Ns, for simplicity. As the topology of the control circuit 17 is the same as that of the foregoing embodiments, the detailed description thereof will be omitted hereinbelow. Although only the single DC/DC converter 1A is shown in FIG. 8, parallel running with the respective DC/DC converters 1A, 1B . . . may be performed like the foregoing embodiments.

On the secondary side of the transformer 5 is provided an output circuit for supplying the voltage induced in the secondary winding 7 of the transformer 5 to the load 2, said voltage serving as the output voltage Vo. The output circuit comprises a synchronous rectifying circuit 57 including the MOSFET 11 serving as a rectifying switch element whose drain and source are connected to an output voltage line from the first terminal of the secondary winding 7 to the load 2; and the MOSFET 22 serving as a free-wheeling switch whose drain and source are connected to a series circuit of the secondary winding 7 and the MOSFET 11.

More specifically, the synchronous rectifying circuit 57 comprises the switch element 52 whose drain and source are connected between the dotted side terminal of the secondary winding 7 and the gate of the MOSFET 11, said switch element 52 driving a gate drive signal voltage supplied to the MOSFET 22 with peak-charged voltage; a gate drive circuit 58 for supplying a gate drive signal to the MOSFET 22 during the off period of the switching element 8; a diode 59 whose anode is connected to an output terminal of the gate drive circuit 58; a capacitor 60 whose the first terminal is connected to a cathode of the diode 59 and the other terminal is connected to the aforesaid output voltage line to which is connected the MOSFET 11; a discharging resistor 61 connected across the capacitor 60; and an on-off changing circuit 62 in which a connection point between the cathode of the diode 59 and the capacitor 60 is connected to the gate of the switch element 52. The on-off changing circuit 62 is to keep the switch element 52 "on" while the gate drive signals are being supplied to the gate of the MOPSFET 22 by the gate drive circuit 58 (i.e., during the actuation of the switching element 8) on the one hand, while it is to turn off the switch element 52 in order to forcedly disconnect the gate of the MOSFET 11 to thereby keep the MOSFET 11 "off" against any output voltage applied from the external, when the gate drive signals are not supplied by the gate drive circuit 58 in association with the stoppage of the switching element 8 on the other hand.

Further, the gate drive circuit 68 of the invention is so selected that it may cut off the gate-source voltage Vgs' of the MOSFET 22 to zero volt when the switching element 8 is not performing switching action and the apparatus is non-operated. Thus, if the gate drive signal from the gate drive circuit 58 stops, then the diode 59 which constructs the aforesaid on-off changing circuit 62 turns on so that the capacitor 60 can be speedily discharged by the resistor 61.

Next, the action of the above-structured switching power supply is described.

During the on period of the switching element 8 when the switching power supply of the invention is being operated, on-voltage (=Vi Ns/Np) is developed on the dotted side terminal of the secondary winding 7, in proportion to the turn ratio (Ns/Np) relative to the primary winding 6. As long as the switching element 8 repeats the on-off changing action, the diode 59 turns on by the high-level gate drive signals supplied by the gate drive circuit 58 during the off period of the switching element 8 so that the capacitor 60 is charged through the diode 59. As the capacitor 60 is charged every time the switching element 8 turns off, the value of the charge voltage in the capacitor 60 substantially becomes equal to that of a peak voltage of the gate drive signal even though the gate signal from the gate drive circuit 58 is temporarily turned to low level during the on period of the switching element 8. Accordingly, the charge voltage in the capacitor 60 is applied to the gate or control terminal of the switch element 52 so that the switch element 52 turns on, whereby the gate-source voltage Vgs of the MOSFET 11 becomes equal to the on-voltage in the secondary winding 7 (Vgs=Vi Ns/Np). Thus, energy is supplied from the secondary winding 7 of the transformer 5 to the choke coil 13 and the load 2 across the MOSFET 11. In the meantime, as the gate drive signals from the gate drive circuit 58 are at low level during the on period of the switching element 8, the MOSFET 22 turns off.

What should be noted herein is that the gate-source voltage Vgs of the MOSFET 11 only depends upon the input voltage Vi and the turn ratio of the transformer, and it is not affected by any other elements inclusive of the respective elements that construct the on-off changing circuit 62, such as diode 59, capacitor 60 and resistor 61.

For example, if the number of turn of the primary winding 6 is denoted by Np, and that of the secondary winding 7 by Ns in the circuit diagram shown in FIG. 3, the drain terminal voltage across the switch element 52 during the on period of the switching element 8 becomes higher than the Zener voltage Vz1 of the Zener diode 54, so that the Zener diode 54 is allowed to conduct to thereby turn on the switch element 52. At this moment, the gate-source voltage Vgs of the MOSFET 11 equals the on voltage in the secondary winding 7 minus the Zener diode Vz1 minus a threshold voltage Vth52 of the switch element 52 itself (Vgs=Vi Ns/Np−Vz1−Vth52).

Further, if the gate-source voltage Vgs of the MOSFET 11 during the on-period of the switching element 8 rises, in association with the change in the input voltage Vi, yet the gate-source voltage Vgs of the MOSFET 11 is clamped at a certain fixed value when the gate-source voltage Vgs reaches Zener voltage Vz2 of the Zener diode 55 minus the threshold voltage Vth52 of the switch element 52. Namely, the maximum gate-source voltage Vgsmax of the MOSFET 11 during the on-period of the switching element 8 equals the Zener voltage Vz2 of the Zener diode 55 minus the threshold voltage Vth52 of the switch element 52 (Vgsmax=Vz2−Vth52). Accordingly, even if the input voltage Vi is varied in a wide range to some extent, yet the change in the gate-source voltage Vgs of the MOSFET 11 is suppressed to a small value, and thus the MOSFET 11 with the existing voltage resistance characteristics can be easily used as it is even if the input voltage Vi is raised.

However, if the output voltage Vo minus the Zener voltage Vz1 of the Zener diode 54 minus the threshold voltage Vth52 of the switch element 52 exceeds a threshold voltage Vth11 of the MOSFET 11, in other words, an equation: Vth11>Vo−Vz1−Vth52 holds true in the case that the output voltage Vo is applied from the external when the switching element 8 is not operated, then the MOSFET 11 connected to the output voltage line turns on so that stress is developed in the respective elements of the switching power supply.

To avoid the above situation, the circuit may be designed so as to make the Zener voltage Vz1 of the Zener diode 54 larger and to make the threshold voltage Vth52 of the switch element 52 larger as well. Then, the gate-source voltage of the MOSFET 11 would not reach the threshold voltage Vth11 even though the output voltage Vo is high to some extent, so that the MOSFET 11 can be prevented from turning on. However, if the Zener voltage Vz1 and the threshold voltage Vth52 are designed to define larger values, the gate-source voltage Vgs of the MOSFET 11 becomes small during the actuation of the power supply apparatus, so that the on-state resistance of the MOSFET 11 becomes large. As a result, it becomes impossible to realize high efficiency in power supply apparatus by which synchronous rectifying system should originally be featured. In other words, such an optimal design that the on-resistance of the MOSFET 11 may be made smaller during the actuation on the one hand, while the MOSFET 11 may not be turned on if the output voltage Vo is applied from the external during the stoppage on the other hand, is very difficult due to mutual trade-off.

According to the present embodiment, however, it is possible to set the gate-source voltage Vgs of the MOSFET 11 at high value without being affected by other elements, and thus the on-resistance of the MOSFET 11 becomes so small that it becomes impossible to realize high efficiency in power supply apparatus by which synchronous rectifying system should originally be featured.

When the switching element 8 is turned into an off-period, the gate signals are fed out from the gate drive circuit 58 to the MOSFET 22 so that the MOSFET 22 turns on. Thus, inertial current flowing through the choke coil 13 is kept on being supplied as energy to the load 2. On the other hand, whilst the switch element 52 is kept in an on state even during the off period of the switching element 8, the MOSFET 11 turns off as the positive voltage is developed on the non-dotted side terminal of the secondary winding 7.

Further, if the gate-source voltage Vgs of the MOSFET 11 during the on-period of the switching element 8 rises, in association with the change in the input voltage Vi, yet the gate-source voltage Vgs of the MOSFET 11 is clamped at a certain value when the gate-source voltage Vgs reaches the gate-source voltage Vgs' of the MOSFET 22 minus forward voltage drop Vf of the diode 59 minus the threshold voltage Vth52 of the switch element 52. Namely, the maximum gate-source voltage Vgsmax of the MOSFET 11 during the on-period of the switching element 8 equals the gate-source voltage Vgs' of the MOSFET 22 minus the forward voltage drop Vf of the diode 59 minus the threshold voltage Vth52 of the switch element 52 (Vgsmax=Vgs'−Vf−Vth52). Accordingly, even if the input voltage Vi is varied in a wide range to some extent, yet the change in the gate-source voltage Vgs of the MOSFET 11 is suppressed to a small value, and thus the MOSFET 11 with the existing voltage resistance characteristics can be easily used as it is even if the input voltage Vi is raised.

Furthermore, when the switching element 8 is not operated, the supply of the gate drive signals from the gate drive circuit 58 to the MOSFET 22 is stopped, so that the gate-source voltage Vgs' of the MOSFET 22 drops to zero volt. Then, the energy stored in the capacitor 60 is shifted to the resistor 61 rapidly and then discharged so that the gate-source voltage of the switch element 52 drops to thereby keep the switch element 52 in an off state. In other words, the gate-source voltage Vgs of the MOSFET 11 is turned to zero volt due to the foregoing equation of the maximum Vgs(max), so that both the MOSFET 11 and the MOSFET 22 are turned off. Accordingly, even though any output voltage Vo is applied from the external, the MOSFET 11 connected to the output voltage line is not turned on as long as the gate-source voltage Vgs' of the MOSFET 22 remains zero volt, thereby ensuring the preventing of the stress developed in the respective circuit elements.

According to the present embodiment, there is provided a switching power supply in which the positive voltage developed on the dotted side terminal of the secondary winding 7 of the transformer 5 during the on period of the switching element 8 is supplied to the control terminal or gate of the MOSFET 11 serving as a rectifying element so that the MOSFET 11 turns on, while the drive signals are supplied from the gate drive circuit 58 to the control terminal or gate of the MOSFET 22 serving as a free-wheeling element when the positive voltage is developed on the non-dotted side terminal of the secondary winding 7 of the transformer 5 during the off period of the switching element 8 so that the MOSFET 22 turns on, wherein said switching power supply comprises the switch element 52 connected between the dotted side terminal of the secondary winding 7 of the transformer 5 and the gate of the MOSFET 11; and the on-off changing circuit 62 which turns on the switch element 52 as long as the drive signals are being supplied by the gate drive circuit 58, while it turns off the switch element 52 when the drive signals therefrom stop in association with the stoppage of the switching element 8.

During the actuation of the switching element 8, the gate drive signals supplied from the gate drive circuit 58 to the MOSFET 22 during the off period of the switching element 8 can be used to turn on the switch element 52, whereby it is possible to turn on the MOSFET 11 synchronously with the on period of the switching element 8, using sufficient amount of the gate-source voltage Vgs. Further, during the stoppage of the switching element 8, the stop of the drive signal supply from the gate drive circuit 58 can be utilized to turn off the switch element 52, whereby the MOSFET 11 can be kept from being turned on against any output voltage applied from the external. In this way, as the on-off action of the switch element 52 is determined, solely depending upon whether the drive signals are supplied from the gate drive circuit 58 or not, the on-resistance of the MOSFET 11 during the actuation can be made small, while the MOSFET 11 can be prevented from being turned on even though the output voltage Vo is applied from the external during the stoppage thereof.

Specifically, the on-off changing circuit 62 of the present embodiment comprises a peak charge circuit for turning on the switch element 52 irrespective of the on-off action of the switching element 8 by charging the capacitor 60 with the drive signals from the gate drive circuit 58, in such a manner that a charging voltage is supplied to the gate of the switch element 52 on the one hand, while the capacitor 60 is rapidly discharged, using the discharging resistor 61 if the drive signals from the gate drive circuit 58 stop on the other hand.

The switch element 52 must be in an on state at least during the on period of the switching element 8. If an inverting circuit is provided for that purpose in order to invert the drive signals from the gate drive circuit 58 so as to supply them to the control terminal of the switch element 52, then a complex circuit topology due for example to the difficult timing for the on-off switching will be resulted. According to the peak charge circuit of the present embodiment, however, the switch element 52 is always turned on, using the charging voltage of the capacitor 60 during the actuation of the switching element 8, and thus it is not necessary to take the on-off timing into consideration, thus resulting in a simple circuit design. Further, as the capacitor 60 rapidly discharges by the discharging resistor 61 if the switching element 6 is not operated, it is possible to prevent the rectifying MOSFET 11 from being turned on without fail.

The present invention should not be limited to the foregoing embodiments, but may be modified within a scope of the invention. For example, BJT (bipolar junction transistor), IGBT (insulated gate bipolar transistor) and any other suitable combination of transistors and diodes other than the MOSFET in the foregoing embodiments may be used for the switching element of the invention. Further, each DC/DC converter 1A, 1B . . . may be operated alone in the respective embodiments. Moreover, the charging switch 44 or any related structure thereof in the third and fourth embodiment may be incorporated into the first, second and fifth embodiment.

What is claimed is:

1. A switching power supply comprising a DC/DC converter in which a switching element connected to a primary winding of a transformer turns on or off to thereby take out an AC voltage from a secondary winding of the transformer, said AC voltage thus taken out being rectified by a synchronous rectifying switch element connected in series to the secondary winding so as to obtain a DC output voltage, wherein said switching power supply further comprises:
a switch element which is connected between a control terminal of said rectifying switch element and a first terminal of said secondary winding where a positive voltage is induced when said switching element turns on; and
a voltage regulation element for turning on said switch element by the voltage induced on the first terminal of the secondary winding when said switching element turns on so as to supply the voltage to the control terminal of said rectifying switch element.

2. A switching power supply comprising a plurality of said DC/DC converters set forth in claim 1, said DC/DC converters being connected in parallel.

3. A switching power supply according to claim 1, wherein said voltage regulation element comprises a Zener diode, said Zener diode defining a Zener voltage which is lower than an on-voltage induced in the secondary winding of said transformer, but is higher than the output voltage.

4. A switching power supply according to claim 1, further comprising a by-pass element for discharging electric charge stored in the control terminal of said rectifying switch element.

5. A switching power supply comprising a DC/DC converter in which a switching element connected to a primary winding of a transformer turns on or off to thereby take out an AC voltage from a secondary winding of the transformer, said AC voltage thus taken out being rectified by a synchronous rectifying switch element connected in series to the secondary winding so as to obtain a DC output voltage, wherein said switching power supply further comprises:
a switch element which is connected between a control terminal of said rectifying switch element and a first terminal of the secondary winding where a positive voltage is induced when the switching element turns on;
a first voltage regulation element for level shifting the voltage induced in the first terminal of the secondary winding during an on period of said switching element, and then applying the same to the control terminal of said rectifying switch element; and
a second voltage regulation element for defining a maximum voltage level to be applied to the control terminal of said rectifying switch element.

6. A switching power supply comprising a plurality of said DC/DC converters set forth in claim 1, said DC/DC converters being connected in parallel.

7. A switching power supply according to claim 5, wherein said first voltage regulation element comprises a Zener diode, said Zener diode defining a Zener voltage which is lower than an on-voltage induced in the secondary winding of said transformer, but is higher than the output voltage.

8. A switching power supply according to claim 5, wherein said second voltage regulation element comprises a Zener diode for defining a maximum voltage level to be applied to the control terminal of said rectifying switch element.

9. A switching power supply comprising a DC/DC converter in which a switching element connected to a primary winding of a transformer turns on or off to thereby take out an AC voltage from a secondary winding of the transformer, said AC voltage thus taken out being rectified and smoothed by a synchronous rectifying switch element connected to the secondary winding, a free-wheeling switch element, a smoothing choke coil and a capacitor so as to obtain a DC output voltage, wherein said switching power supply further comprises:
a charging switch element which is connected between a control terminal of said free-wheeling switch element and a first terminal of the secondary winding where a positive voltage is induced when the switching element turns off, so that said charging switch element turns on during an off period of the switching element when the DC/DC converter is operating, while said charging switch element turns off when the DC/DC converter is non-operated.

10. A switching power supply according to claim 9, wherein a discharging element is connected in parallel across both terminals of said charging switch element.

11. A switching power supply according to claim 9, wherein a discharging switch is connected to the control terminal of said free-wheeling switch element so as to discharge electric charge stored in the control terminal of said free-wheeling switch element.

12. A switching power supply according to claim 11, further comprising a control circuit commonly used for alternate on-off control of said charging switch and discharging switch.

13. A switching power supply according to claim 12, wherein said charging switch, discharging switch and control circuit are connected one another through an insulating element.

14. A switching power supply in which a voltage induced on a first terminal of a secondary winding of a transformer during an on period of a switching element is supplied to a control terminal of a rectifying switch element so as to turn on the rectifying switch element, while drive signals are supplied from a drive circuit to a control terminal of a free-wheeling switch element when a voltage is induced on a second terminal of the secondary winding of the transformer during an off period of the switching element so as to turn on the free-wheeling switch element, said switching power supply including a switch element connected between the first terminal of the secondary winding of the transformer and the control terminal of the said rectifying switch element, wherein said switching power supply comprises an on-off changing circuit which turns on said switch element with drive signals as long as the drive signals are being supplied from the drive circuit, while it turns off the switch element when the drive signals therefrom stop in association with the stoppage of the switching element.

15. A switching power supply according to claim 14, wherein said on-off changing circuit comprises a peak charge circuit for turning on the switch element irrespective of the on-off action of the switching element by charging the capacitor with the drive signals from the drive circuit in such a manner that a charging voltage is supplied to the control terminal of the switch element on one hand, while the capacitor is rapidly discharged, using a discharging resistor if the drive signals from the drive circuit stop on the other hand.

16. A switching power supply according to claim 14, wherein said drive circuit is structured such that the control terminal of said free-wheeling switch is kept at zero volts when the said switching element stops operating.

17. A switching power supply according to claim 15, wherein a unidirectional conduction element is connected between the said capacitor and the control terminal of said free-wheeling switch element to prevent the charged voltage in said capacitor from being applied to the control terminal of the free-wheeling switch element.

* * * * *

UNITED STATES PATENT AND TRADEMARK OFFICE
CERTIFICATE OF CORRECTION

PATENT NO. : 6,580,626 B2
DATED : June 17, 2003
INVENTOR(S) : Takegami, Eiji

It is certified that error appears in the above-identified patent and that said Letters Patent is hereby corrected as shown below:

Column 4,
Line 14, insert a period after "5"
Line 43, replace "3 V" with -- 3V --
Line 46, replace "13 V" with -- 13V --

Column 5,
Line 19, replace "A" with -- At --
Line 34, replace "s" with -- is --

Column 7,
Line 25, replace "turn" with -- turns --

Column 8,
Line 41, replace "Vi = 100 v" with -- Vi=100v --
Line 42, replace "33=17 V" with -- 33-17V --
Line 48, replace "10V" with -- =150V --

Column 9,
Line 18, replace "A" with -- At --

Column 12,
Line 19, replace "he gate fo" with -- the gate of --

UNITED STATES PATENT AND TRADEMARK OFFICE
CERTIFICATE OF CORRECTION

PATENT NO. : 6,580,626 B2
DATED : June 17, 2003
INVENTOR(S) : Takegami, Eiji

It is certified that error appears in the above-identified patent and that said Letters Patent is hereby corrected as shown below:

Column 13,
Line 37, replace "3" with -- 33 --

Column 14,
Line 4, replace "A" with -- At --

Column 15,
Line 30, replace "MOPSFET" with -- MOSFET --

Signed and Sealed this

Twenty-ninth Day of June, 2004

JON W. DUDAS
*Acting Director of the United States Patent and Trademark Office*